United States Patent
Kaiya et al.

(10) Patent No.: US 7,421,550 B2
(45) Date of Patent: *Sep. 2, 2008

(54) STORAGE SYSTEM AND STORAGE SYSTEM MANAGEMENT METHOD

(75) Inventors: Keiichi Kaiya, Hadano (JP); Katsuhiro Okumoto, Odawara (JP); Shuji Kondou, Odawara (JP)

(73) Assignee: Hitachi, Ltd., Tokyo (JP)

( * ) Notice: Subject to any disclaimer, the term of this patent is extended or adjusted under 35 U.S.C. 154(b) by 273 days.

This patent is subject to a terminal disclaimer.

(21) Appl. No.: 11/254,717

(22) Filed: Oct. 21, 2005

(65) Prior Publication Data

US 2007/0050574 A1 Mar. 1, 2007

(30) Foreign Application Priority Data

Sep. 1, 2005 (JP) ............................ P2005-253440

(51) Int. Cl.
*G06F 12/00* (2006.01)
(52) U.S. Cl. ..................... 711/162; 711/100; 711/114; 711/161; 707/204; 714/6
(58) Field of Classification Search ................ 711/100, 711/112, 114, 161, 162; 707/204; 714/6, 714/7

See application file for complete search history.

(56) References Cited

U.S. PATENT DOCUMENTS 7,017,003 B2 * 3/2006 Murotani et al. ............ 711/100

2005/0050288 A1 3/2005 Takahashi et al.
2005/0055523 A1 3/2005 Suishu et al.

FOREIGN PATENT DOCUMENTS

JP 2005-078453 9/2003
JP 2005-084953 9/2003

* cited by examiner

*Primary Examiner*—Jasmine Song
(74) *Attorney, Agent, or Firm*—Reed Smith LLP; Stanley P. Fisher, Esq.; Juan Carlos A. Marquez, Esq.

(57) ABSTRACT

A storage system secures system redundancy through a simple configuration. A primary storage control device and first secondary storage control device are connected by a synchronous method, and the primary storage control device and a second secondary storage control device are connected by an asynchronous method. The primary storage control device sets control numbers for update data, and saves journal data. The primary storage control device transmits the update data to the first secondary storage control device. The first secondary storage control device writes update data to a first secondary volume, and uses a plurality of bitmap tables to manage differences. If the primary storage control device stops operation, the first secondary storage control device becomes the new primary storage control device. Differential copying is performed from the first secondary storage control device to the second secondary storage control device.

15 Claims, 21 Drawing Sheets

T11 — JOURNAL GROUP #1

| | | | |
|---|---|---|---|
| JOURNAL GROUP #1 | BM#1 | #0 | 00100100001010011··· |
| | | #1000 | 11010010111001010··· |
| | | #2000 | 01100100101010000··· |
| | | #3000 | 00001001111101011··· |
| | | ··· | ··· |
| | BM#2 | #0 | 00000000000000000··· |
| | | #1000 | 00000000000000000··· |
| | | #2000 | 00000000000000000··· |
| | | #3000 | 00000000000000000··· |
| | | ··· | ··· |

T12 — JOURNAL GROUP #2

| | | | |
|---|---|---|---|
| JOURNAL GROUP #2 | BM#1 | #0 | 11100101001010011··· |
| | | #1000 | 00010010110001010··· |
| | | #2000 | 01010100100010000··· |
| | | #3000 | 00101001100101010··· |
| | | ··· | ··· |
| | BM#2 | #0 | 00100001100000100··· |
| | | #1000 | 10000010000000001··· |
| | | #2000 | 00011100000010000··· |
| | | #3000 | 01100001010100000··· |
| | | ··· | ··· |

FIG. 9

PAIR MANAGEMENT TABLE (PRIMARY STORAGE CONTROL DEVICE) — T21

| P-VOL # | VOLUME ATTRIBUTES | GROUP # | FIRST S-VOL # | FIRST SECONDARY GROUP # | PAIR TYPE | PAIRED STATE | SECOND S-VOL # | SECOND SECONDARY GROUP # | PAIR TYPE | PAIRED STATE |
|---|---|---|---|---|---|---|---|---|---|---|
| #000 | PRIMARY | #1 | #100 | #1 | SYNCHRONOUS | PAIR | #500 | #3 | ASYNCHRONOUS | PAIR |
| #001 | PRIMARY | #1 | #101 | #1 | SYNCHRONOUS | SUSPEND | #501 | #3 | ASYNCHRONOUS | SUSPEND |
| #002 | UNUSED | — | — | — | — | — | — | — | — | — |
| #003 | PRIMARY | #2 | #103 | #2 | SYNCHRONOUS | PAIR | #502 | #4 | ASYNCHRONOUS | PAIR |

{ INFORMATION FOR PRIMARY STORAGE CONTROL DEVICE } { INFORMATION FOR FIRST SECONDARY STORAGE CONTROL DEVICE } { INFORMATION FOR SECOND SECONDARY STORAGE CONTROL DEVICE }

FIG. 10

PAIR MANAGEMENT TABLE (FIRST SECONDARY STORAGE CONTROL DEVICE) T22

| FIRST S-VOL # | VOLUME ATTRIBUTES | FIRST SECONDARY GROUP # | P-VOL# | GROUP # | PAIR TYPE | PAIRED STATE | SECOND S-VOL # | SECOND SECONDARY GROUP # | PAIR TYPE | PAIRED STATE | CURRENT BM # | BM ADDRESS |
|---|---|---|---|---|---|---|---|---|---|---|---|---|
| #000 | SECONDARY | #1 | #000 | #1 | SYNCHRONOUS | PAIR | #500 | #3 | ASYNCHRONOUS | PAIR | #0 | #1000 |
| #001 | SECONDARY | #1 | #001 | #1 | SYNCHRONOUS | SUSPEND | #501 | #3 | ASYNCHRONOUS | SUSPEND | #0 | #2000 |
| #002 | UNUSED | — | — | — | — | — | — | — | — | — | #1 | #3000 |
| #003 | SECONDARY | #2 | #003 | #2 | SYNCHRONOUS | PAIR | #502 | #4 | ASYNCHRONOUS | PAIR | #0 | #4000 |

INFORMATION FOR FIRST SECONDARY STORAGE CONTROL DEVICE

INFORMATION FOR PRIMARY/SECONDARY STORAGE CONTROL DEVICE

INFORMATION FOR SECOND SECONDARY STORAGE CONTROL DEVICE

INFORMATION FOR BM

FIG. 11

PAIR MANAGEMENT TABLE (SECOND SECONDARY STORAGE CONTROL DEVICE) T23

| SECOND S-VOL # | VOLUME ATTRIBUTES | SECOND SECONDARY GROUP # | FIRST S-VOL # | FIRST SECONDARY GROUP # | PAIR TYPE | PAIRED STATE | P-VOL # | GROUP # | PAIR TYPE | PAIRED STATE |
|---|---|---|---|---|---|---|---|---|---|---|
| #500 | SECONDARY | #3 | #100 | #1 | SYNCHRONOUS | — | #000 | #1 | ASYNCHRONOUS | PAIR |
| #501 | SECONDARY | #3 | #101 | #1 | SYNCHRONOUS | — | #001 | #1 | ASYNCHRONOUS | SUSPEND |
| #502 | UNUSED | — | — | — | — | — | — | — | — | — |
| #503 | SECONDARY | #4 | #103 | #2 | SYNCHRONOUS | — | #003 | #2 | ASYNCHRONOUS | PAIR |

INFORMATION FOR SECOND SECONDARY STORAGE CONTROL DEVICE

INFORMATION FOR FIRST SECONDARY STORAGE CONTROL DEVICE

INFORMATION FOR PRIMARY STORAGE CONTROL DEVICE

US 7,421,550 B2

STORAGE SYSTEM AND STORAGE SYSTEM MANAGEMENT METHOD

CROSS-REFERENCE TO RELATED APPLICATIONS

This application relates to and claims priority from Japanese Patent Application No. 2005-253440, filed on Sep. 1, 2005, the entire disclosure of which is incorporated herein by reference.

BACKGROUND OF THE INVENTION

1. Field of the Invention

The present invention relates to a storage system and a management method for a storage system.

2. Description of the Related Art

A storage system comprises at least one storage control device, called for example a disk array subsystem or similar, and provides data storage services to host computers (hereafter "hosts"). A storage control device can construct a storage area based on a RAID (Redundant Array of Independent Disks) system, in which numerous disk drives are arranged in an array.

As is known in so-called disaster recovery systems, it is possible to position a backup site remotely from the primary site in anticipation of widespread disasters and similar. A storage control device for backups is provided at the backup site, and the same data group as at the primary site is stored in the storage control device. By this means, even when the primary site operation is halted due to malfunctions or similar, data processing services can be continued by the backup site. However, if a malfunction occurs in the sole backup site, data processing services cannot be provided to hosts.

Hence technology has been proposed to provide a plurality of backup sites, so that even if operation of the primary site halts, the system redundancy is retained (Japanese Patent Laid-open No. 2005-84953). In the prior art disclosed in this reference, as described in paragraphs numbered 0008 to 0010, a plurality of secondary storage control devices are connected to the primary storage control device. When the stored contents of the primary storage control device are updated, the updated contents are immediately transmitted to one of the secondary storage control devices, and are reflected in the stored contents of the one secondary storage control device. The stored contents of the primary storage control device are saved as journal data, and other secondary storage control devices read this journal data as appropriate and reflect the data in their own stored contents. The one secondary storage control device creates journal data based on a data update command from the primary storage control device, and saves the journal data. When operation of the primary storage control device stops, the other secondary storage control devices read the journal data from the one secondary storage control device, and update their own stored contents.

In another technology of the prior art, the storage contents of the first storage device of a primary site and the storage contents of the third storage device of a local site are kept in permanent synchronization through remote copying, while the storage contents of the first storage device and the storage contents of the second device of a remote site are made to coincide periodically (Japanese Patent Laid-open No. 2005-78453). When a disaster befalls the primary site, only the differential data between the storage contents of the first storage device and the storage contents of the second storage device are remotely copied from the third storage device to the second storage device.

In the technology disclosed in the first and second references, when operation of the primary storage control device is stopped, redundancy can be retained through the plurality of storage control devices, and the reliability of the storage system can be improved. However, in the first reference, the one secondary storage control device must generate journal data each time data updating is performed, so that the load on the one secondary storage control device is increased. Moreover, a volume must be provided to save the journal data in the one secondary storage control device, so that there is the problem of increased structural complexity.

In the technology described in the second reference, a copy volume of the primary volume in the first storage device is created, and the storage contents of this copied volume are made to coincide with the storage contents of a volume in the second storage device. Hence volume copy processing and similar is necessary, and the period during which the storage contents of the first storage device and the storage contents of the second storage device are not coincident becomes comparatively long. Further, it is necessary to prepare in advance a volume for copying with the same capacity as the primary volume.

SUMMARY OF THE INVENTION

This invention was devised in light of the above problems, and has as an object the provision of a storage system and storage system management method enabling the securing of redundancy by a plurality of storage control devices even when operation of one storage control device has stopped, and which moreover enable maintenance of data integrity through a comparatively simple configuration. Other objects of the present invention will be apparent from embodiments to be described later.

In order to resolve the above problems, in a storage system according to one perspective of the invention, a second storage control device and a third storage control device are each connected to a first storage control device. The first storage control device comprises a first data volume, a first journal volume which manages the update history of the first data volume, and a first control portion, which, when a higher-level device writes write data to the first data volume, sets a control number for the write data and generates journal data, causes this journal data to be stored in the first journal volume, and transmits the write data to the second storage control device. The second storage control device comprises a second data volume associated with the first data volume, and a second control portion which causes write data received from the first control portion to be stored in the second data volume, and moreover causes the write data storage position to be stored in a differential management table. The third storage control device comprises a third data volume associated with the first data volume, a second journal volume associated with the first journal volume, and a third control portion, which reads journal data from the first journal volume and causes the data to be stored in the second journal volume, and which, based on journal data stored in the second journal volume, causes the stored contents of the third data volume to be updated. When switching from the first storage control device to the second storage control device, the second control portion transmits differential data to the third storage control device based on the differential management table, and causes the differential data to be stored in the third volume.

That is, the first storage control device, upon receiving write data from a higher-level device, sets a control number for the write data (including address information) and saves the journal data, and in addition transmits the write data to the second storage control device. The control number is a number used to manage the order of data updating; for example, control numbers may be generated as continuous numbers incremented by one upon each data update. The second storage control device causes updates of the second data volume in synchronization with the updates of the first data volume. The third storage control device, by acquiring the journal data stored in the first journal volume with appropriate timing, causes the third data volume to be updated. Hence the contents of the first data volume and the second data volume are synchronized, and there is the possibility that differences may occur between the stored contents of the first data volume or second data volume and the third data volume. The second storage control device stores the storage positions of write data in the differential management table. In the differential management table, the data updates performed on the second data volume are managed from a prescribed point in time onward.

When, due to a disaster or similar, the functions of the first storage control device have stopped, switching from the first storage control device to the second storage control device is performed, and the second storage control device is used as the primary storage control device. Because the same contents as in the first data volume are stored in the second data volume, the second storage control device can continue to provide the storage service which had been provided by the first storage control device. The second control portion searches for differential data based on the contents stored in the differential management table, and transmits the differential data to the third storage control device. The third storage control device causes the received differential data to be stored in the third volume. By this means, a backup of the second data volume is formed, and the redundancy of the storage system is retained.

In one aspect, when a copy pair is formed in which the second data volume is the primary volume and the third data volume is the secondary volume, the second control portion notifies the higher-level device of the completion of switching from the first storage control device to the second storage control device. That is, the higher-level device is notified of switching completion before the storage contents of the second data volume and of the third data volume coincide. By this means, the switching time can be shortened, and convenience of use is improved.

In one aspect, when switching is performed from the first storage control device to the second storage control device, if a higher-level device writes write data to the second data volume, the second control portion sets a control number for the write data and generates journal data, and stores this journal data in the third journal volume. The third control portion causes the journal data to be read from the third journal volume and stored in the second journal volume, and moreover causes updating of the stored contents of the third data volume based on the journal data stored in the second journal volume. That is, when switching from the first storage control device to the second storage control device is performed, the second storage control device generates journal data and causes the journal data to be stored in the third journal volume, similarly to the processing which had been performed by the first storage control device. The third storage control device reads journal data from the third journal volume and causes updating of the stored contents of the third data volume, similarly to the processing which had been performed by the first storage control device. When the second storage control device begins journal management, the differential management table is unnecessary. Hence the differential management table can be deleted, to increase the free space in memory resources.

In one aspect, a plurality of differential management tables are provided, and the second control portion switches between and uses the plurality of differential management tables. For example, two tables, which are a first differential management table and a second differential management table, are prepared in advance, and initially the first differential management table is used to manage differences; when the first differential management table becomes full, switching from the first differential management table to the second differential management table can be performed. In this case, the stored contents of the first differential management table can be deleted when there is no longer a need to hold the contents. By this means, the amount of differential data which can be managed can be increased.

In one aspect, a plurality of differential management tables are provided, and upon switching from the first storage control device to the second storage control device, the second control portion detects differential data based on the storage contents of each of the plurality of differential management tables, transmits the detected differential data to the third storage control device, and causes the data to be stored in the third volume. When the plurality of differential management tables are used while switching therebetween, it is possible that switching from the first storage control device to the second storage control device may be performed before the stored contents of a differential management table prior to switching become unnecessary. In such a case, the sum is taken of the stored contents of the differential management table currently in use and the contents stored in the differential management table which had previously been used, and differential data is detected. By this means, the stored contents of the second data volume and of the third data volume can be made to coincide.

In one aspect, when the value of control numbers set for write data received from a higher-level device reach a switching threshold value set in advance, the first control portion issues a switching instruction to the second control portion, and moreover when the value of control numbers set for journal data read from the first journal volume by the third control portion reach an erase threshold value set in advance, the first control portion issues an erase instruction to the second control portion. Upon receiving a switching instruction, the second control portion switches the differential management table being used among the plurality of differential management tables, and upon receiving an erase instruction, erases the stored contents of the differential management table being used before the differential management table currently in use among the plurality of differential management tables.

The switching threshold value is used to issue switching instructions to cause switching among the plurality of differential management tables. The erase threshold value is used to issue erase instructions to cause erasure of the stored contents of the differential management table previously being used. The switching threshold value and erase threshold value may be set to different values, or may be set to the same value. When both are set to the same value, the storage amount can be reduced.

In one aspect, the first, second and third control portions ascertain in advance the associative relationship with the first, second and third data volumes, and with the first and second journal volumes. Hence when switching from the first storage control device to the second storage control device, the second storage control device can quickly form a copy pair of the second data volume and third data volume, so that switching time can be shortened.

Instead of this, in another aspect, the second control portion ascertains in advance the correspondence relation between the first data volume and the second data volume, and the third control portion ascertains in advance the correspondence relation between the first data volume and the third data volume as well as the correspondence relation between the first journal volume and the second journal volume. When switching from the first storage control device to the second storage control device, the second control portion acquires confirmation information from the third control portion to confirm the correspondence relation between the second data volume and the third data volume, and based on this acquired confirmation information, forms a copy pair from the second data volume and the third data volume. That is, based on the confirmation information acquired from the third control portion, the second control portion conforms the existence of the third volume to be synchronized with the second volume, and forms the copy pair. By this means, the second control portion and third control portion need only hold the correspondence relations with the first storage control device, and so the storage capacity to store correspondence relations can be reduced.

A storage system management method according to another perspective of the invention is a method of managing a storage system in which a second storage control device and a third storage control device are each connected to a first storage control device, and comprising a step, when a higher-level device writes write data to a first data volume of the first storage control device, of setting a control number for the write data and generating journal data; a step of storing the generated journal data in a first journal volume of the first storage control device; a step of transmitting the write data from the first storage control device to the second storage control device; a step of storing the write data, transmitted from the first storage control device to the second storage control device, in a second data volume of the second storage control device; a step of causing the storage position at which the write data was stored in the second data volume to be registered in a differential management table; a step, when prescribed timing arrives, of accessing the first storage control device from the third storage control device, and acquiring the journal data stored in the first journal volume; a step of causing the acquired journal data to be stored in the second journal volume of the third storage control device; and, a step, based on the journal data stored in the second journal volume, of causing the stored contents of a third data volume of the third storage control device to be updated.

In addition, a storage system management method of this invention may also comprise a step of monitoring whether a malfunction has occurred in the first storage control device; a step, when a malfunction has occurred in the first storage control device, of causing differential data to be transferred to the third storage control device, and of differential data to be stored in the third volume, based on the stored contents of the differential management table; a step of forming a copy pair, with the second data volume as the primary volume and the third data volume as the secondary volume; a step, when a copy pair has been formed, of notifying the higher-level device of the completion of switching from the first storage control device to the second storage control device; a step, when a higher-level device has written write data to the second data volume, of setting a control number for this write data and generating journal data; a step of causing the generated journal data to be stored in the third journal volume of the second storage control device; a step, when prescribed timing has arrived, of accessing the second storage control device from the third storage control device, and of acquiring the journal data stored in the third journal volume; a step of causing the acquired journal data to be stored in the second journal volume; and, a step, based on the journal data stored in the second journal volume, of causing the stored contents of the third data volume to be updated.

At least a portion of the means, functions, or steps of this invention may in some cases be configured as a computer program to be read and executed by a microcomputer. Such a computer program can be recorded on and distributed by means of recording media such as, for example, hard disks or optical discs. Also, such a computer program can be provided via a communication network such as the Internet.

BRIEF DESCRIPTION OF THE DRAWINGS

FIG. 8 shows the configuration of a management table used in performing differential management, in a first secondary storage control device;

FIG. 9 shows a pair of management tables held in the primary storage control device;

FIG. 10 shows a pair management table held in the first secondary storage control device;

FIG. 11 shows a pair management table held in a second secondary storage control device;

DESCRIPTION OF THE PREFERRED EMBODIMENTS

Figure 1:
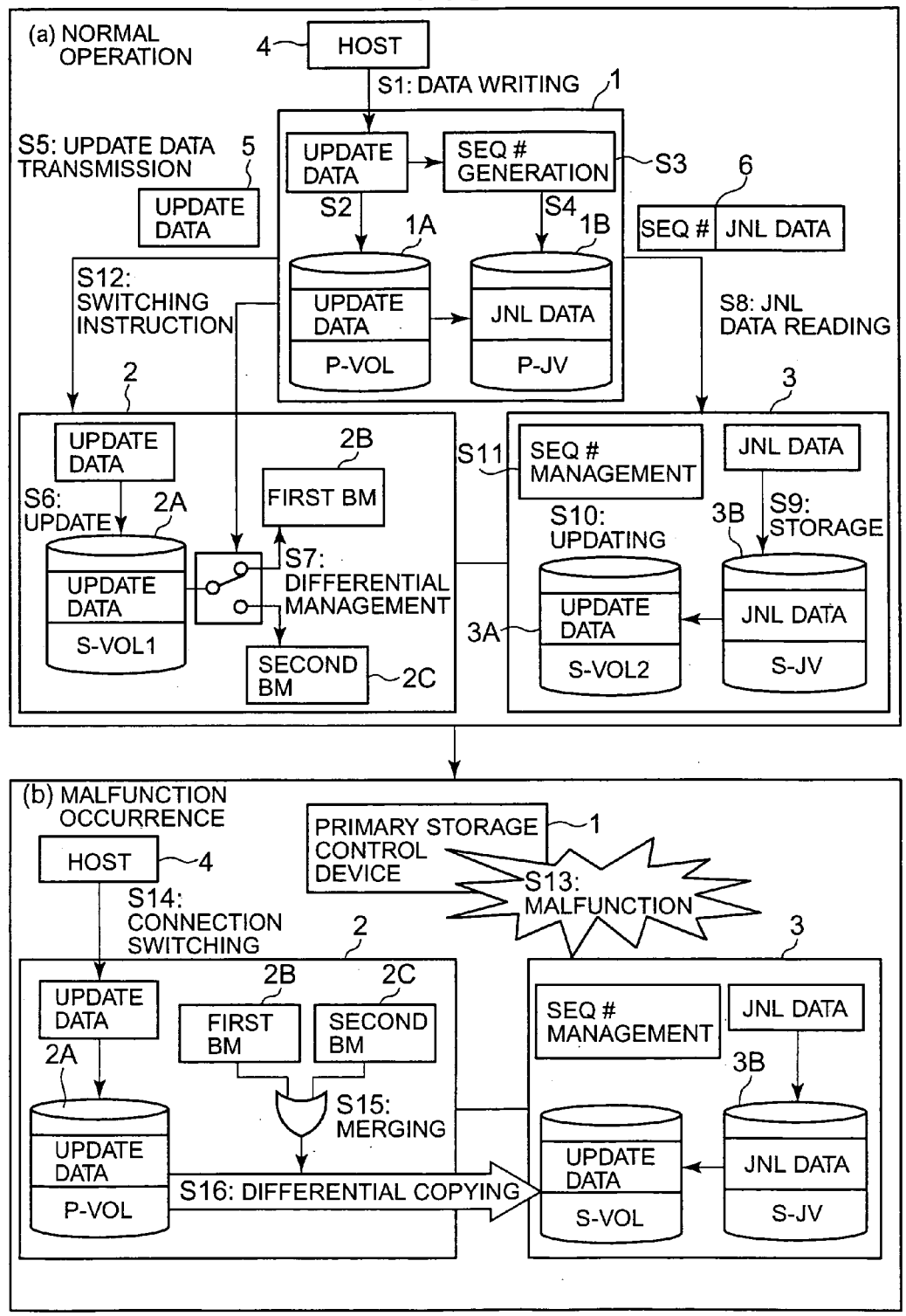
FIG. 1 shows an overall summary of an aspect of the invention.

Below, aspects of the invention are explained based on the drawings. FIG. 1 shows the overall concept of one aspect. In FIG. 1, (1) shows the state of normal operation. The storage system can comprise, for example, a primary storage control device 1, equivalent to a "first storage control device"; a first secondary storage control device 2, equivalent to a "second storage control device"; a second secondary storage control device 3, equivalent to a "third storage control device"; and a host computer 4, equivalent to a "higher-level device".

The primary storage control device 1 comprises a primary volume (P-VOL) 1A and a primary journal volume (P-JV) 1B. The primary volume 1A, equivalent to the "first data volume", stores data used by the host 4, and is updated by the host 4. The primary journal volume 1B, equivalent to the "first journal volume", manages the update history of the primary volume 1A. Journal data stored in the primary journal volume 1B is configured to, for example, associate update data (write data) and control numbers (SEQ#'s).

The first secondary storage control device 2 is connected, in a manner enabling communication, to the primary storage control device 1, and comprises a first secondary volume (S-VOL) 2A, equivalent to the "second data volume", as well as a plurality of differential management tables 2B, 2C. In the drawing, differential management tables are represented by "BM" (for BitMap). The first secondary volume 2A forms a copy pair with the primary volume 1A, and is configured to immediately reflect the contents of updates to the primary volume 1A.

The first differential management table 2B and second differential management table 2C manage the positions of write data written to the first secondary data volume 2A beginning at a prescribed time (the time at which differential management is begun). As the units for management of data storage positions, for example, block units, track units, or other units can be used. For example, when data in a certain block is updated, a bit corresponding to this block can be set to "1". By this means, it is possible to manage information indicating which portions of the first secondary data volume 2A have been updated.

Here, the first secondary storage control device 2 can be installed at for example a location comparatively close to the primary storage control device 1. The contents of data updating of the primary storage control device 1 are immediately transmitted to the first secondary storage control device 2. Data writing between the first secondary storage control device 2 and the primary storage control device 1 is performed by a so-called synchronization method. When a write command is issued to the primary storage control device 1, the primary storage control device 1 transfers the write command and the write data to the first secondary storage control device 2, and after receiving a processing completion report from the first secondary storage control device 2, issues a processing completion report to the host 4. Hence when using a synchronization method to process write commands, there is a need to pay attention to delays in responses from the first secondary storage control device 2 to the primary storage control device 1. When the primary storage control device 1 and first secondary storage control device 2 are positioned in comparatively close locations, the delay between the two can be ignored for practical purposes.

The second secondary storage control device 3 is connected, in a manner enabling communication, to the primary storage control device 1, and comprises a second secondary volume 3A and a secondary journal volume 3B. The second secondary storage control device 3 is for example provided in a location removed a distance from the location of installation of the primary storage control device 1. The second secondary volume 3A is equivalent to the "third data volume", and the secondary journal volume 3B is equivalent to the "second journal volume". The second secondary storage control device 3 reads journal data from the journal volume 1B of the primary storage control device 1 as necessary with prescribed timing, and stores journal data in the secondary journal volume 3B.

Based on journal data stored in the secondary journal volume 3B, the second secondary storage control device 3 causes the stored contents of the second secondary volume 3A to be updated. Hence, whereas the stored contents of the primary volume 1A and the stored contents of the first secondary volume 2A are for practical purposes synchronized in real-time, a difference arises between the stored contents of the primary volume 1A and the stored contents of the second secondary volume 3A. By having the second secondary storage control device 3 read all the journal data from the primary storage control device 1, the stored contents of the primary volume 1A and the stored contents of the second secondary volume 3A can be made to coincide.

The first secondary storage control device 2 and the second secondary storage control device 3 are connected in a manner enabling communication. However, during normal operation in which the primary storage control device 1 is operating normally, there is no particular need for communication between the secondary storage control devices 2 and 3. As a communication network connecting the storage control devices 1, 2 and 3, for example a SAN (Storage Area Network) or LAN (Local Area Network) or similar can be used.

In FIG. 1, (b) shows a case in which a malfunction has occurred in the primary storage control device 1 and operation is stopped. The first secondary storage control device 2 becomes the primary storage control device, in place of the stopped primary storage control device 1. The storage control device 2, which has become the primary storage control device, performs data communication with the second secondary storage control device 3, and forms a copy pair between the volume 2A and the volume 3A.

Overall operation is explained. First, as shown in (a) of FIG. 1, the host 4 accesses the primary volume 1A and writes data (S1). The primary storage control device 1 writes update data (write data) received from the host 4 to the primary volume 1A (S2).

The primary storage control device 1 sets a control number (SEQ #) for the update data (S3). This control number is a number used to manage the order of updates; the value is added automatically each time update data is written to the primary volume 1A. The primary storage control device 1 generates journal data which associates the control number and the update data, and causes this journal data to be stored in the primary journal volume 1B (S4).

The primary storage control device 1 transmits update data 5 received from the host 4 to the first secondary storage control device 2 (S5). This update data 5 comprises the data itself, and the address at which the data itself is to be stored. The first secondary storage control device 2 writes the update data to the first secondary volume 2A (S6). The first secondary storage control device 2 causes the update position of the first secondary volume 2A to be stored in whichever of the differential management tables 2B and 2C is selected as the current table (S7). The tables 2B and 2C are switched and used in alternation based on switching instructions from the primary storage control device 1.

The first secondary storage control device 2, upon writing the update data to the first secondary volume 2A, issues a report of writing completion to the primary storage control device 1. The primary storage control device 1 then issues a report to the host 4 indicating the completion of data updating of the primary volume 1A.

On the other hand, the second secondary storage control device 3 repeatedly accesses the primary storage control device 1 with for example a comparatively short period, and reads journal data 6 from the primary journal volume 1B (S8). The second secondary storage control device 3 causes the read-out journal data 6 to be stored in the secondary journal volume 3B (S9). The second secondary storage control device 3, after confirming the order of the journal data 6, incorporates the update data into the second secondary volume 3A (S10). The second secondary storage control device 3 manages the control numbers using the secondary journal volume 3B (S11).

The primary storage control device 1 monitors the control numbers of journal data 6 retrieved from the primary journal volume 1B by the second secondary storage control device 3. When the control numbers of the retrieved journal data 6 have reached a prescribed switching threshold value, set in advance, the primary storage control device 1 issues a switching instruction to the first secondary storage control device 2 (S12). Upon receiving this switching instruction, the first secondary storage control device 2 switches the differential management table currently being used to another differential management table.

As indicated in (b) of FIG. 1, when some malfunction occurs and the primary storage control device 1 is stopped (S13), the first secondary storage control device becomes the new primary storage control device. However, for convenience of explanation, in the following this device will continue to be called the first secondary storage control device 2. Hence the destination accessed by the host 4 is switched from the primary storage control device 1 to the first secondary storage control device 2 (S14). When the host 4 connected to the primary storage control device 1 and the host 4 connected to the first secondary storage control device 2 are different, the host using the storage service can also be switched, from the host 4 connected to the primary storage control device 1 to the host 4 connected to the first secondary storage control device 2.

The first secondary storage control device 2 takes the logical sum of the stored contents of the first differential management table 2B and the stored contents of the second differential management table 2C to merge the two (S15), and searches the differential data. The second secondary storage control device 2 reads differential data identified by the search from the first secondary volume 2A, and transmits the read data to the second secondary storage control device 3 (S16). The second secondary storage control device 3 causes the received differential data to be stored in the second secondary volume 3A.

Upon completion of differential copying between the volumes 2A and 3A, the stored contents of the first secondary volume 2A and of the second secondary volume 3A coincide. On completion of differential copying, the first secondary storage control device 2 issues a report to the host 4 to the effect that switching between storage devices has been completed. A detailed explanation is given below, but the first secondary storage control device 2 begins journal management so as to enable operation similar to that of the primary storage control device 1. Upon receiving a write command from the host 4, the first secondary storage control device 2 creates and stores journal data.

The second secondary storage control device 3 accesses the first secondary storage control device 2 which has become the primary storage control device and retrieves journal data, and based on this journal data, causes updating of the stored contents of the second secondary volume 3A.

Thus in this aspect, a configuration is adopted in which a primary storage control device 1, first secondary storage control device 2, and second secondary storage control device 3 are interconnected, the stored contents of the primary volume 1A are stored in the first secondary volume 2A and in the second secondary volume 3A, and when the primary storage control device 1 stops operation, system redundancy is retained by the first secondary storage control device 2 and the second secondary storage control device 3. Hence reliability is improved.

In this aspect, a configuration is adopted in which the first secondary storage control device 2 employs the differential management tables 2B and 2C to manage data updates of the first secondary volume 2A from a prescribed point in time onward, and when the primary storage control device 1 stops operation, differential data is transmitted to the second secondary storage control device 3 and stored. Hence compared with the case in which full copying is performed between the first secondary volume 2A and the second secondary volume 3A, the time required for pair formation can be shortened. Further, the first secondary storage control device 2 does not comprise a mechanism for managing the point up to which the second secondary storage control device 3 has updated the second secondary volume 3A, but transmits differential data from a prescribed point in time onward. Hence the control structure can be simplified.

In this aspect, a configuration is adopted in which the first secondary storage control device 2 and second secondary storage control device 3, which may serve as the primary storage control device, are connected through an asynchronous reading method (also called an UR method). That is, the occurrence of temporary differences between the volumes 2A and 3A is accommodated, and differential data is managed as journal data by the storage control device 2 which is the copy source. Hence at the time of formation of a copy pair using the volumes 2A and 3A, a report of switching completion can be issued to the host 4, so that switching time can be shortened and the convenience of use and reliability can be improved. Below, this aspect is explained in further detail.

Embodiment 1

Figure 2:
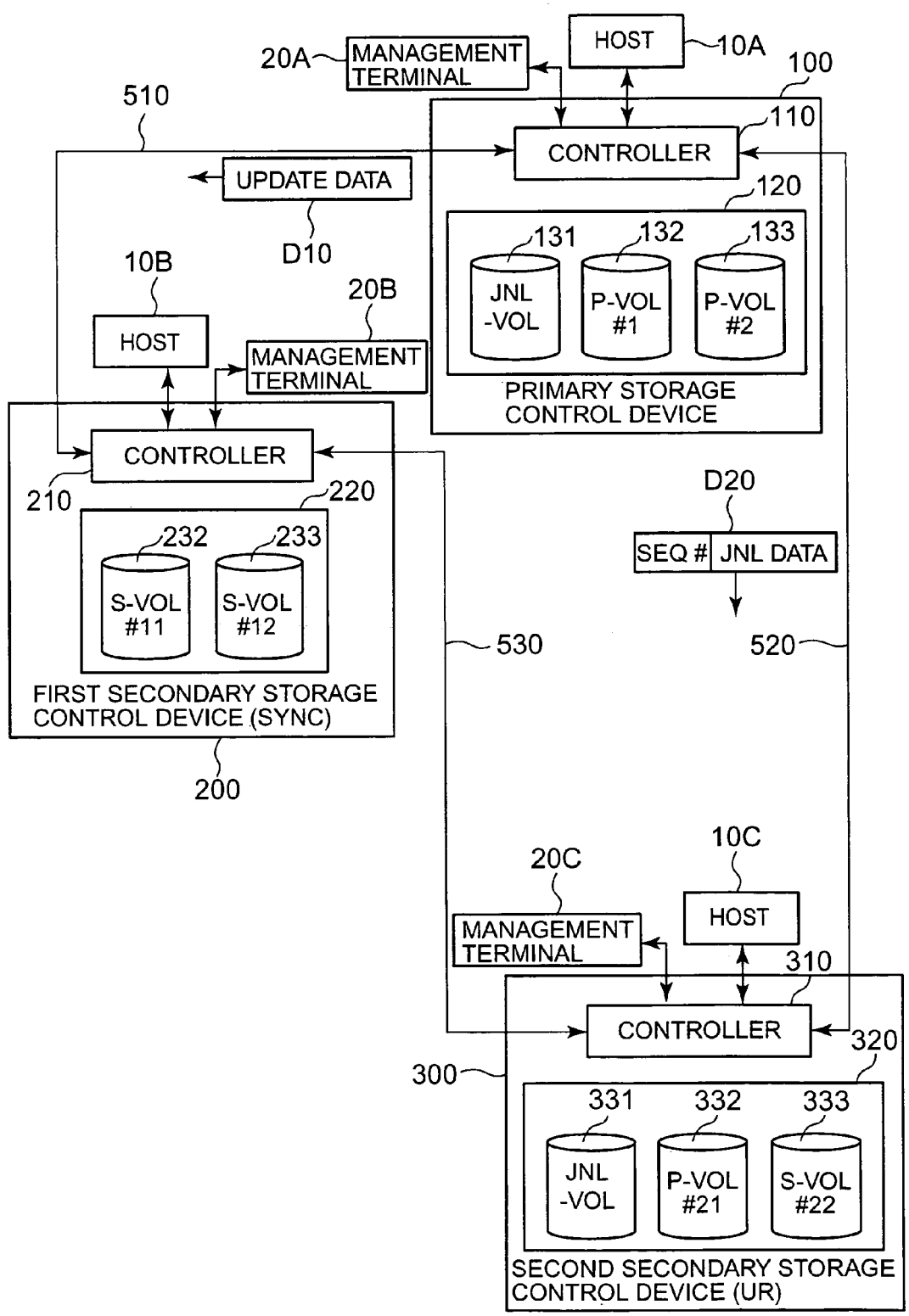
FIG. 2 shows the overall configuration of a storage system.

FIG. 2 shows the overall configuration of a storage system of this invention. The correspondence relations with FIG. 1 are as follows. The primary storage control device 100 corresponds to the primary storage control device 1 in FIG. 1; the first secondary storage control device 200 corresponds to the first secondary storage control device 2 in FIG. 1; the second secondary storage control device 300 corresponds to the second secondary storage control device 3 in FIG. 1; and the host 10A corresponds to the host 4 in FIG. 1.

This storage system can be configured comprising one or more primary storage control devices 100, a plurality of secondary storage control devices 200, 300, hosts 10A, 10B, 10C, and management terminals 20A, 20B, 20C. At least a portion of the hosts 10A, 10B, 10C and management terminals 20A, 20B, 20C may be the same. For example, the hosts 10A and 10B, and the management terminals 20A and 20B, may respectively be the same devices.

During normal operation, the primary storage control device 100 is a device which provides data input/output services to the host 10A. A detailed explanation is given below, but the primary storage control device 100 can be configured comprising a controller 110 and storage portion 120. A primary journal volume 131 and a plurality of primary data volumes 132, 133 can be provided in the storage portion 120. The host 10A is for example a mainframe machine, server machine or other computer equipment, which accesses the data volumes 132 and 133 via the controller 110 to read and write data.

The primary storage control device 100 can be connected to the secondary storage control devices 200, 300 via a communication network 510, 520 or similar via, for example, a SAN or the Internet. A detailed explanation is given below, but the primary storage control device 100 uses either active or passive means to supply each of the secondary storage control devices 200, 300 with information relating to data updates performed by the host 10A.

The first secondary storage control device 200, similarly to the primary storage control device 100, can comprise a controller 210 and storage portion 220. The storage portion 220 is provided with, for example, a plurality of first secondary data volumes 232, 233. Each of the first secondary data volumes 232, 232 is associated with the respective primary data volumes 132, 133, and the stored contents coincide for the respective volumes. The first secondary storage control device 200 is connected to the primary storage control device 100 by a so-called synchronization method, and data updates of the primary data volumes 132, 133 are immediately incorporated into the first secondary data volumes 232, 233. The host 10B is a host computer used for backups.

The first secondary storage control device 200 can for example be provided in a location comparatively close to the primary storage control device 100. By shortening the distance between the primary storage control device 100 and the first secondary storage control device 200, delays entailed in data exchanges between the storage control devices 100, 200 can be reduced, and the responsiveness of the primary storage control device 100 can be enhanced.

The second secondary storage control device 300 also, similarly to the primary storage control device 100, can comprise a controller 310 and storage portion 320. The storage portion 320 can be provided with for example a secondary journal volume 331 and a plurality of second secondary data volumes 332, 333. Each of the second secondary data volumes 332, 333 is associated with a respective primary data volume 132, 133. The primary data volumes 132, 133 and the second secondary data volumes 332, 333 are connected by a method which accommodates non-coincidence of the stored contents of each pair. In this Specification, this method may be called an asynchronous reading method (UR method). In an asynchronous reading method, journal data held in the primary storage control device 100 is read, either periodically or aperiodically, by the second secondary storage control device 300, and is incorporated into its own data volumes 332, 333. The second secondary storage control device 300 is connected to the first secondary storage control device 200 via, for example, a SAN, the Internet, or another communication network 530. The host 10C is a host computer used for backups.

The management terminals 20A, 20B, 20C are computer devices to manage the configuration and similar of the storage control devices 100, 200, 300 to which they are respectively connected, and to retrieve internal information for the storage control devices 100, 200, 300. As explained below, depending on the storage management program 12 provided in the hosts 10A, 10B, 10C, various instructions and similar can be provided to each of the storage control devices 100, 200, 300. Hence the management terminals 20A, 20B, 20C may not be necessary.

Each time the host 10A updates the primary data volumes 132, 133, update information D10 is transmitted from the primary storage control device 100 to the first secondary storage control device 200. This update information D10 comprises updated data and address information for the storage destination.

On the other hand, each time the host 10A updates the primary data volumes 132, 133, other update information D20 is generated and is stored in the primary journal volume 131. This update information D20 can also comprise control numbers and update data. The update information D20 can also be called "journal data". The second secondary storage control device 300 accesses the primary storage control device 100, reads the update information D20, that is, the journal data D20, and stores the data in the secondary journal volume 331.

Figure 3:
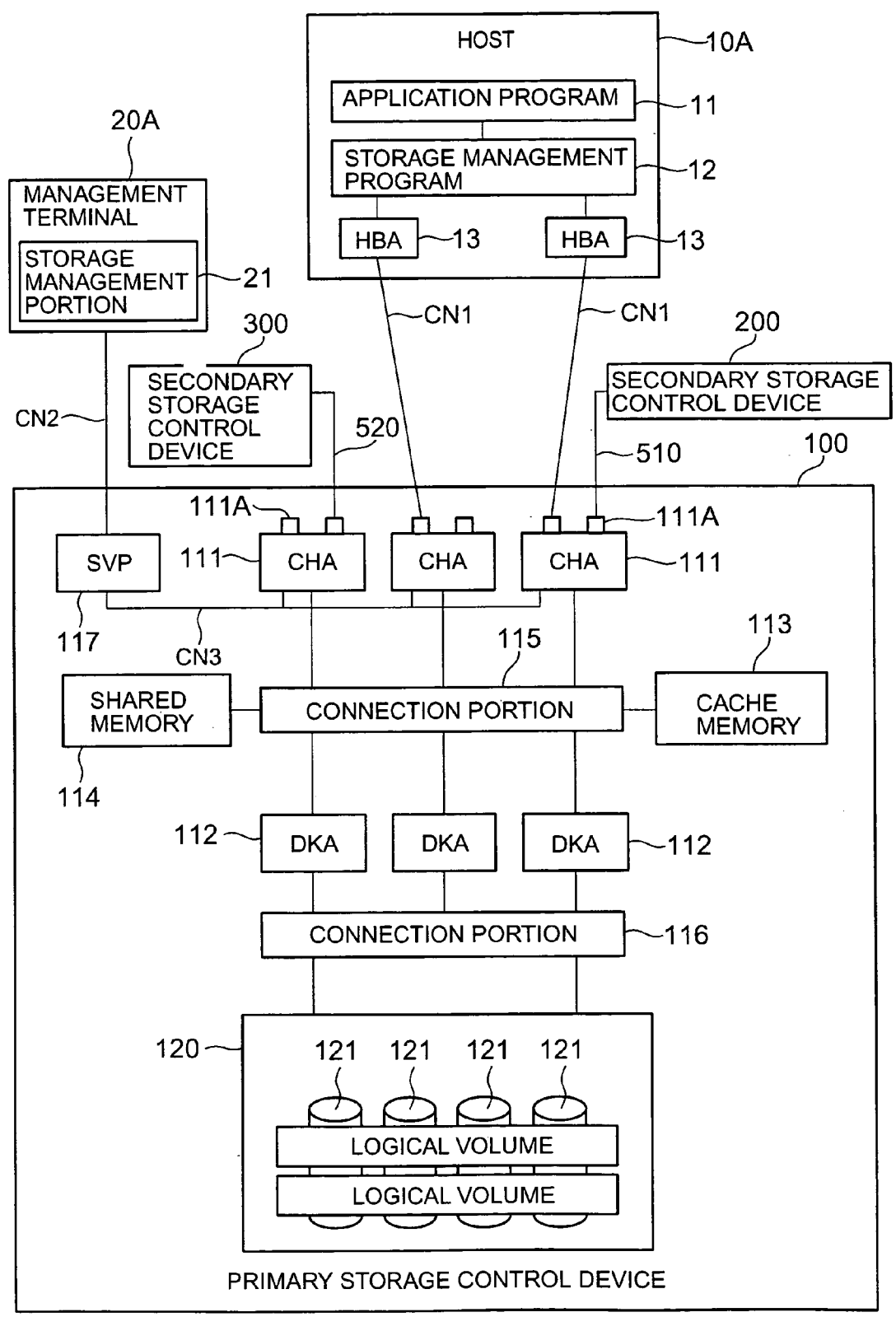
FIG. 3 shows the configuration of a primary site.

FIG. 3 is a block diagram showing the hardware configuration of the storage system. The configuration of the primary site at which the primary storage control device 100 is provided is shown; the first secondary site, at which the first secondary storage control device 200 is provided, and the second secondary site, at which the second secondary storage control device 300 is provided, can have similar configurations.

The host 10A is a computer device comprising a microprocessor, memory and similar, and can for example comprise an application program 11, a storage management program 12, and an HBA (Host Bus Adapter) 13.

The application program 11 is a program which provides data processing services to a client terminal, provided outside the figure, and may be, for example, a customer management program, sales management program, e-mail management program, or similar. The storage management program 12 is a program which issues various instructions to the primary storage control device 100 (and to the secondary storage control devices 200, 300). The HBA 13 is an interface connection portion used for data communication with the primary storage control device 100 (and with the secondary storage control devices 200, 300). Each HBA 13 is connected to the port 111A of the primary storage control device 100 via a SAN or other network CN1.

Pluralities of both the application program 11 and the HBA 13 can be provided, and each can operate independently. By providing a plurality of HBAs 13, even should a malfunction occur in any one of the communication paths, the primary storage control device 100 can be accessed via another communication path.

The management terminal 20A is a computer device comprising a microprocessor, memory and similar, and is provided with a storage management portion 21. The storage management portion 21 issues instructions to modify the configuration of the primary storage control device 100, and reads various states of the primary storage control device 100 and causes the states to be displayed on a terminal screen.

The primary storage control device 100 comprises, for example, at least one channel adapter 111, at least one disk adapter 112, at least one cache memory 113, at least one shared memory 114, connection portions 115 and 116, a service processor 117, and a storage portion 120. The controller 110 shown in FIG. 2 comprises a channel adapter 111, disk adapter 112, and memory units 113, 114.

A channel adapter (hereafter "CHA") 111 is a higher-level communication control portion used to exchange data with a host 10A, and comprises, for example, a microprocessor, local memory, and a data transfer circuit. A CHA 111 comprises at least one communication port 111A. Any one or a plurality of communication ports 111A are connected to HBAs 13 of the host 10A via the network CN1. A plurality of other communication ports 111A are connected to each of the secondary storage control devices 200, 300 via the networks 510, 520.

A disk adapter (hereafter "DKA") 112 is a lower-level communication control portion used to exchange data with a storage portion 120, and comprises, for example, a microprocessor, local memory, and a data transfer circuit. The DKA 112 can be provided on a control board separate from the CHA 111, or the functions of the CHA 111 and the functions of the DKA 112 can coexist on the same control board.

Cache memory 113 is memory for storing, for example, user data used by the host 10A and temporary management information. Shared memory 114 is memory which for example stores various types of control information used to control the primary storage control device 100. A portion of the control information is also copied to local memory in the CHA 111 and DKA 112. The cache memory 113 and shared memory 114 may be provided on separate memory boards, or cache memory 113 and shared memory 114 may coexist on the same memory board.

The connection portion 115 is used for interconnection of each of the CHAs 111, each of the DKAs 112, cache memory 113, and shared memory 114. The connection portion 115 comprises, for example, a bus, crossbar switch, or similar. The connection portion 116 is used for connection of each of the DKAs 112 with the disk drives 121.

The service processor (hereafter "SVP") 117 monitors the various states of the primary storage control device 100, and overwrites control information according to instructions from the management terminal 20A. The SVP 117 is connected to each of the CHAs 111 via, for example, a intra-device network CN3. The SVP 117 can also acquire information in DKAs 112, shared memory 114 and similar via any one of the CHAs 111. A configuration may also be adopted in which the SVP 117 is connected to each of the CHAs 111 and to each of the DKAs 112 via the intra-device network CN3.

The storage portion 120 comprises a plurality of disk drives 121. Disk drives 121 may be, for example, hard disk drives, semiconductor memory devices, holographic memory drives, optical disc drives, magneto-optical disc drives, magnetic tape drives, or similar. By virtualizing the physical storage area of a disk drive 121, one or more logical storage areas can be generated. Such a logical storage area is called a logical volume. The host 10A accesses such logical volumes. Each of the above-described volumes 131, 132, 133 is a logical volume.

The above is a simple explanation of the operation of the primary storage control device 100. When the host 10A issues a read command, a CHA 111 checks whether the data requested by the host 10A exists in cache memory 113. If the data is stored in cache memory 113, the CHA 111 reads the data from cache memory 113 and transmits the data to the host 10A. If however the data requested by the host 10A does not exist in cache memory 113, the CHA 111 requests that a DKA 112 read the data. The instruction from the CHA 111 to the DKA 112 is issued via shared memory 114. The DKA 112, which references shared memory 114 as appropriate, discovers the instruction from the CHA 111, reads the data from the disk drive 121, and stores the data in cache memory 113. This is called staging processing. The CHA 111 is notified of the completion of the staging processing via the shared memory 114. In the event of staging, the DKA 112 converts the physical address into a logical address (LBA: Logical Block Address).

When the host 10A issues a write command, the CHA 111 checks whether there is free space in cache memory 113, and if the write data can be received, receives the write data from the host 10A. The CHA 111 stores the received write data in cache memory 113. The CHA 111 issues an instruction to a DKA 112 to write the data to a logical volume. This instruction is issued via shared memory 114. By conveying various instructions and reports via shared memory 114, a plurality of CHAs 111 and DKAs 112 can be made to operate independently and in parallel through a comparatively simple configuration.

The DKA 112, upon discovering the write command via shared memory 114, writes the write data stored in cache memory 113 to a logical volume. More specifically, the DKA 112 converts the logical address of the write data into a physical address, and causes storage of the write data at a prescribed location in a disk drive 121 comprised by the logical volume to which the writing was requested. When the logical volume has a RAID configuration, the write data is distributed and written to a plurality of disk drives 121. Data transfer from cache memory 113 to disk drives 121 is called destaging processing. The CHA 111 is notified of the completion of destaging processing via shared memory 114. Destaging processing can be performed with appropriate timing according to the processing load on the primary storage control device 100, the free space in cache memory 113, and similar. There is no need to perform destaging processing immediately upon reception of a write command.

The CHA 111 transfers the write command and write data from the host 10A to the first secondary storage control device 200. Upon receiving a report of completion of writing from the first secondary storage control device 200, the CHA 111 issues a report to the host 10A indicating the completion of write command processing. Hence when the write data is stored in both the primary storage control device 100 and in the first secondary storage control device 200, the host 10A is notified of the completion of processing of the write command.

Further, the CHA 111 associates a control number with the write command and write data, generates journal data, and causes this journal data to be stored in the primary journal volume 131. This journal data is transferred from the primary storage control device 100 to the second secondary storage control device 300 based on a read request from the second secondary storage control device 300.

Figure 4:
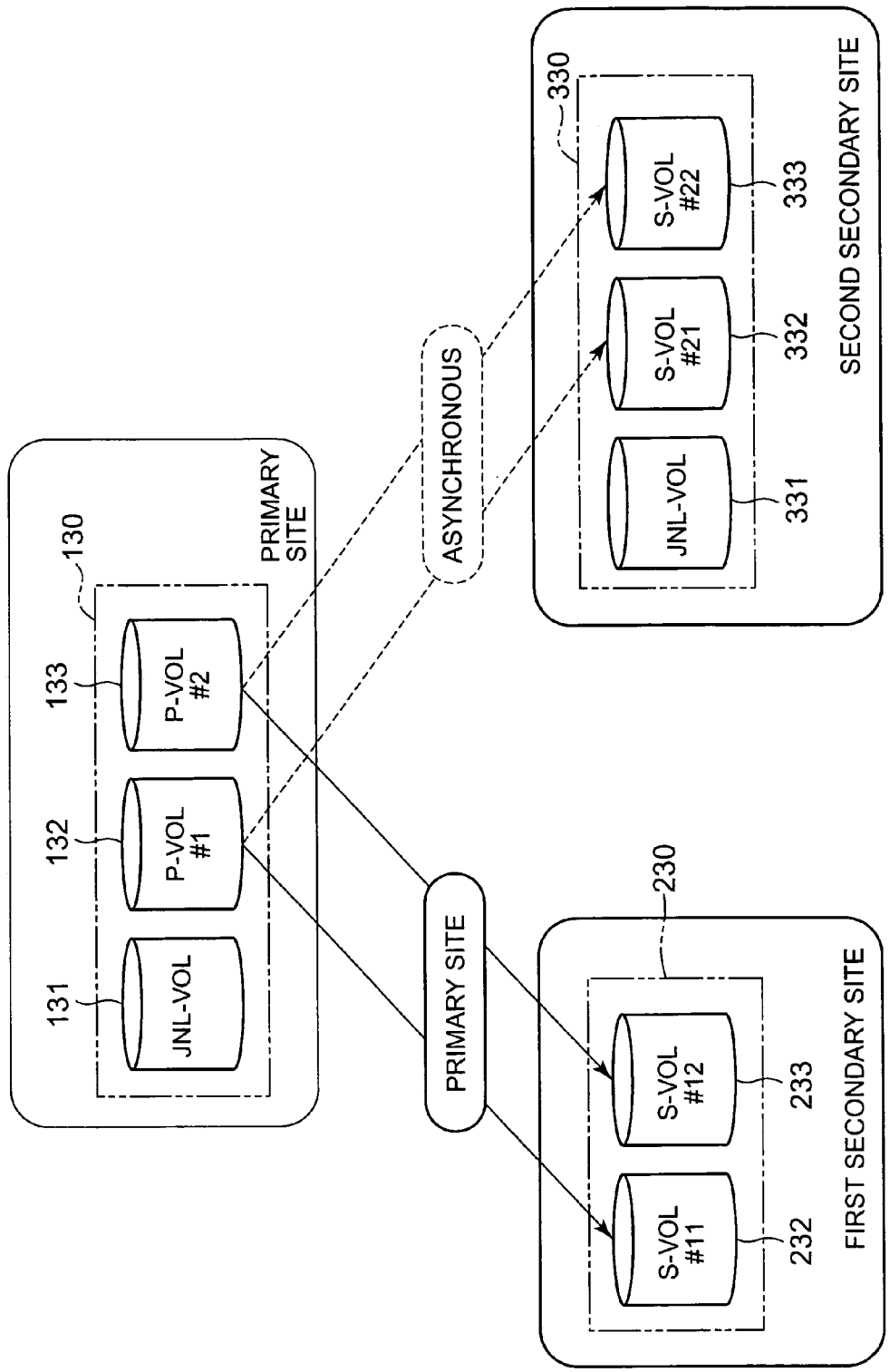
FIG. 4 shows the correspondence relation between the volumes of different sites.

FIG. 4 schematically shows the relation between the different volumes. Each of the volumes 131, 132, 133 of the primary site, that is, the primary storage control device 100, belongs to the same journal group 130. The journal group 130 is a group in which journal data is managed in common. When it is necessary that data updates of the data volumes 132 and 133 be consistent, these data volumes 132, 133 belong to the same group 130. The histories of data updates of the data volumes 132, 133 are managed by the primary journal volume 131.

Similarly at the first secondary site, a journal group 230 is provided, and the first secondary data volumes 232, 233 belong to this journal group 230. The first secondary data volumes 232, 233 are associated with the primary data volumes 132, 133, and the stored contents of each of the first secondary data volumes 232, 233 match, substantially in realtime, the stored contents of the primary data volumes 132, 133. This journal group 230 may be called the first secondary journal group.

At the second secondary site also, a journal group 330 is provided, and within this journal group 330 are provided a secondary journal volume 331 and second secondary data volumes 332, 333. Each of the second secondary data volumes 332, 333 is associated with a primary data volume 132, 133, and although a time difference occurs, the stored contents of the second secondary data volumes 332, 333 match the stored contents of the primary data volumes 132, 133. The histories of data updates of each of the two second secondary data volumes 332, 333 are managed by the second journal volume 331.

Figure 5:
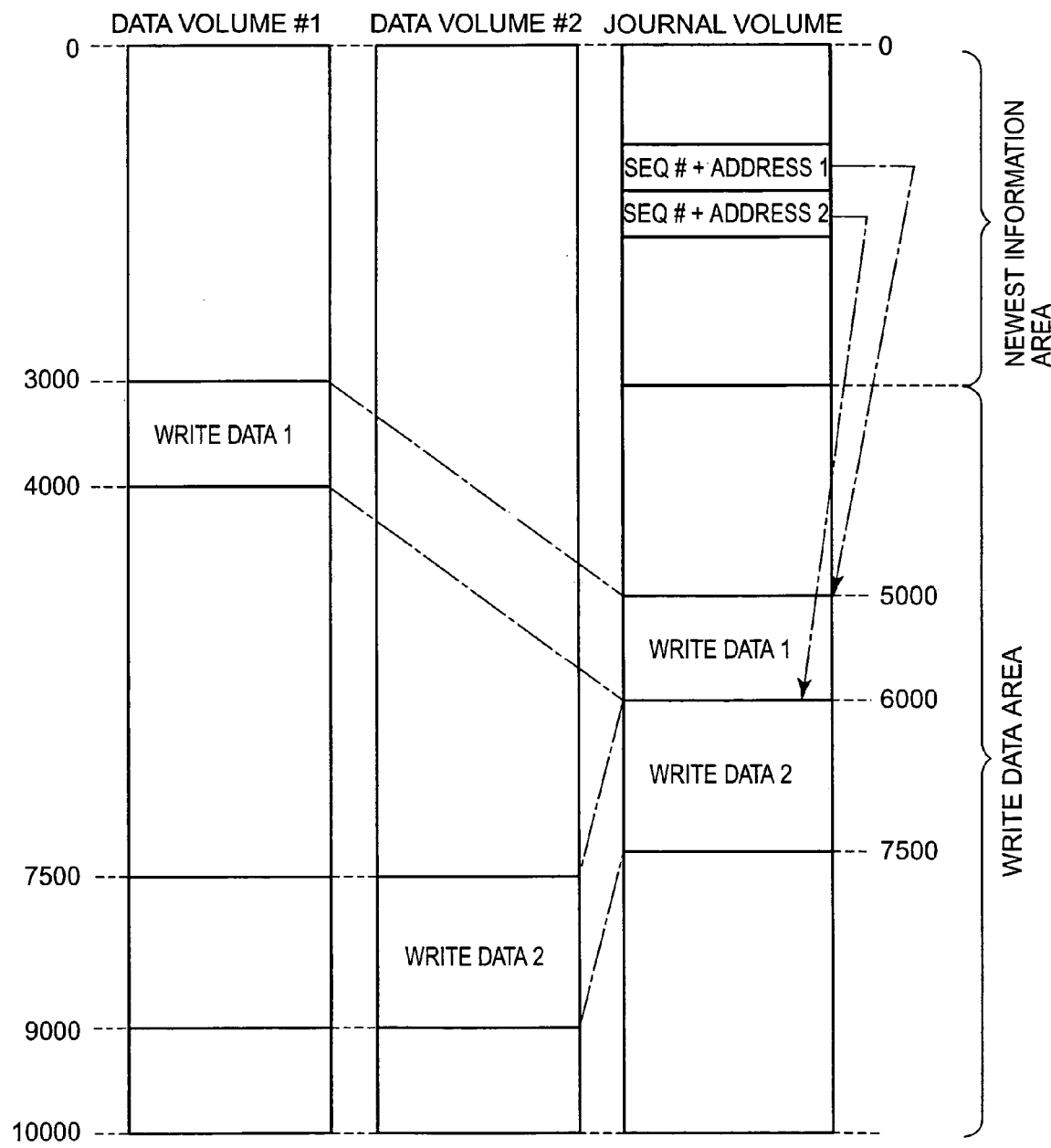
FIG. 5 shows the relation between data volumes and journal volumes.

FIG. 5 shows the relation between data volumes and journal volumes. A journal volume manages data updates of each of the data volumes existing within the journal group. An update information area is provided on the beginning side of the storage area of a journal group, and a write data area is provided in the storage area following this update information area.

A copy of the write data written to the data volumes is stored in the write data area. Control numbers and the storage addresses of write data stored in the write data area are stored, in association, in the update information area. Information comprising these control numbers and storage destination addresses within the journal volume may be called update management information. Control numbers are numbers issued for each data update, and are used to manage the order of updates.

The update information area and the write data area are each used repeatedly. That is, when the update information area is used up to the final address, the position returns to the leading address, and new update management information (control numbers and storage destination addresses) is stored by overwriting old information. Similarly, when the write data area is used up to the final address, the position returns to the leading address of the write data area, and new write data is stored by overwriting old data.

Figure 6:
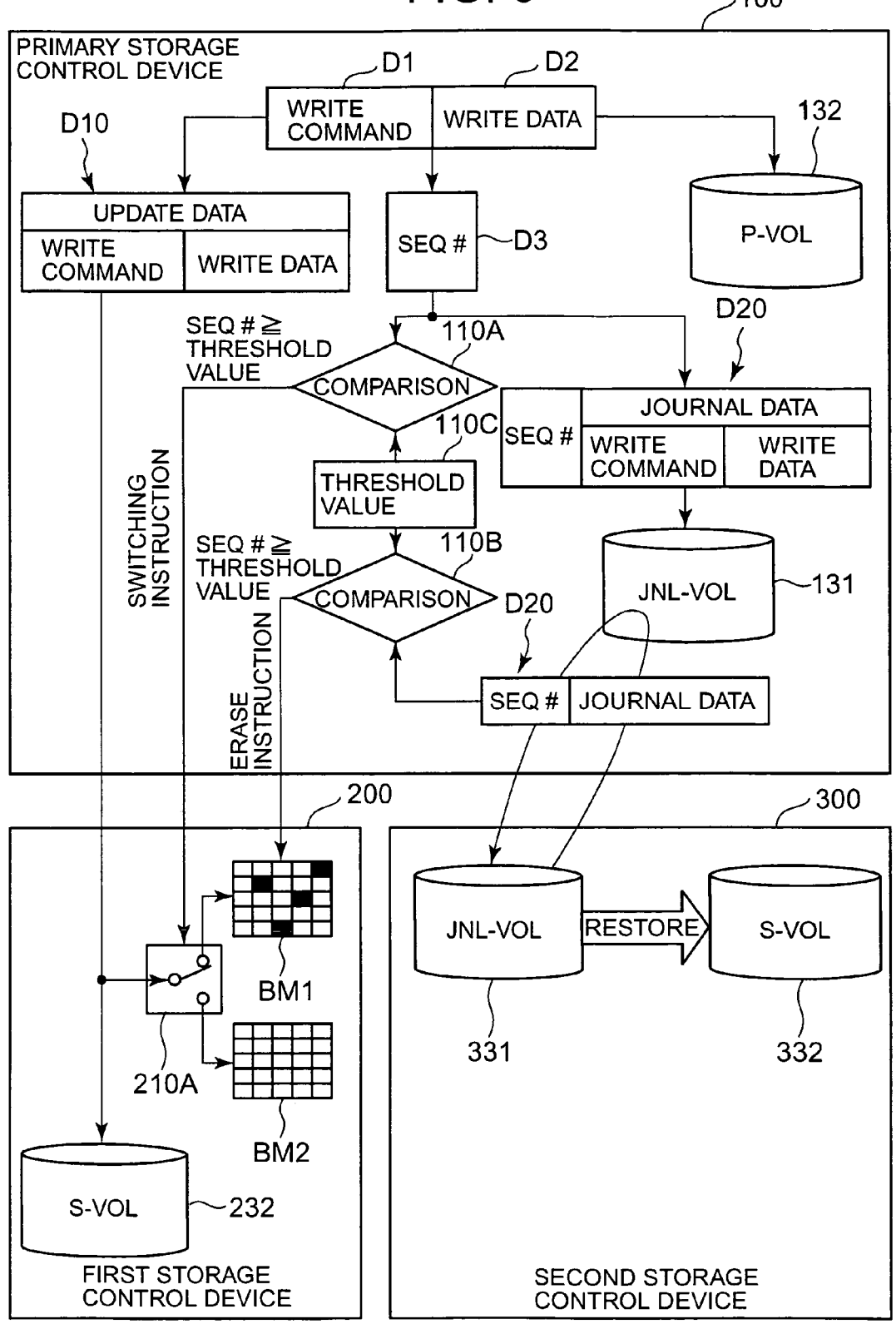
FIG. 6 shows the manner in which information is provided to each of the secondary storage control devices through data updates from a host.

FIG. 6 schematically shows the manner in which data in each secondary data volume is updated according to data updates of the primary data volume. Here, for convenience of explanation, the primary data volume 132 is explained as an example.

The primary storage control device 100, upon receiving a write command D1 and write data D2 from the host 10A, writes the write data to the primary data volume 132. Simultaneously, the primary storage control device 100 generates a control number D3 to use in managing data updates. The control number D3 is generated so as for example to increase by one upon each data update.

The primary storage control device 100 generates journal data D20 using control numbers D3, write commands D1, and write data. This journal data D20 is stored in the primary journal volume 131. The primary storage control device 100 also generates update data D10 using write commands D1 and write data D2. This update data D10 is transmitted to the first secondary storage control device 200. The update data D10 and journal data D20 comprise common information, but the timing of supply to the secondary storage control devices 200 and 300 is different.

The primary storage control device 100 comprises a switching judgment portion 110A, erase judgment portion 110B, and threshold storage portion 110C. Each of the judgment portions 110A and 110B can for example be configured as a computer program. The threshold storage portion 110C can for example be provided in shared memory 114.

The switching judgment portion 110A judges whether the control number in journal data D20 read from the primary journal volume 131 by the second secondary storage control device 300 has reached a threshold value stored in the threshold storage portion 110C. If the control number has reached the threshold value (SEQ#≧threshold value), the switching judgment portion 110A issues a switching instruction to the first secondary storage control device 100.

The erase judgment portion 110B judges whether a control number D3 generated in response to a write request from the host 10A has reached a threshold value stored in the threshold storage portion 110C. If the generated control number has reached the threshold, the erase judgment portion 110B issues an erase instruction to the first secondary storage control device 100.

The first secondary storage control device 200, upon receiving the update data D10, writes the write data D2 to the first secondary data volume 232. The first secondary storage control device 200 also causes the storage position of the write data D2 to be stored in one among the bitmap tables BM1, BM2 in the differential management table T10. The differential management table T10 is described below.

The switching portion 210A switches between the bitmap tables BM1, BM2. Based on a switching instruction from the primary storage control device 100, the switching portion 210A selects the bitmap table to be used as the current table. The two bitmap tables BM1, BM2 are used in alternation. The bitmap table selected by the switching portion 210A is the current table.

The first secondary storage control device 200, upon receiving an erase instruction from the primary storage control device 100, resets the bitmap table before switching, and erases the stored contents.

On the other hand, the second secondary storage control device 300 reads journal data D20 from the primary journal volume 131 and records the read-out journal data D20 in the secondary journal volume 331 with a comparatively short period. The second secondary storage control device 300 checks that the order of journal data is correct based on the control numbers D3, and incorporates into the second secondary data volume 332 the contents of data updates indicated by the journal data D20. This incorporation processing is called restore processing.

Figure 7:
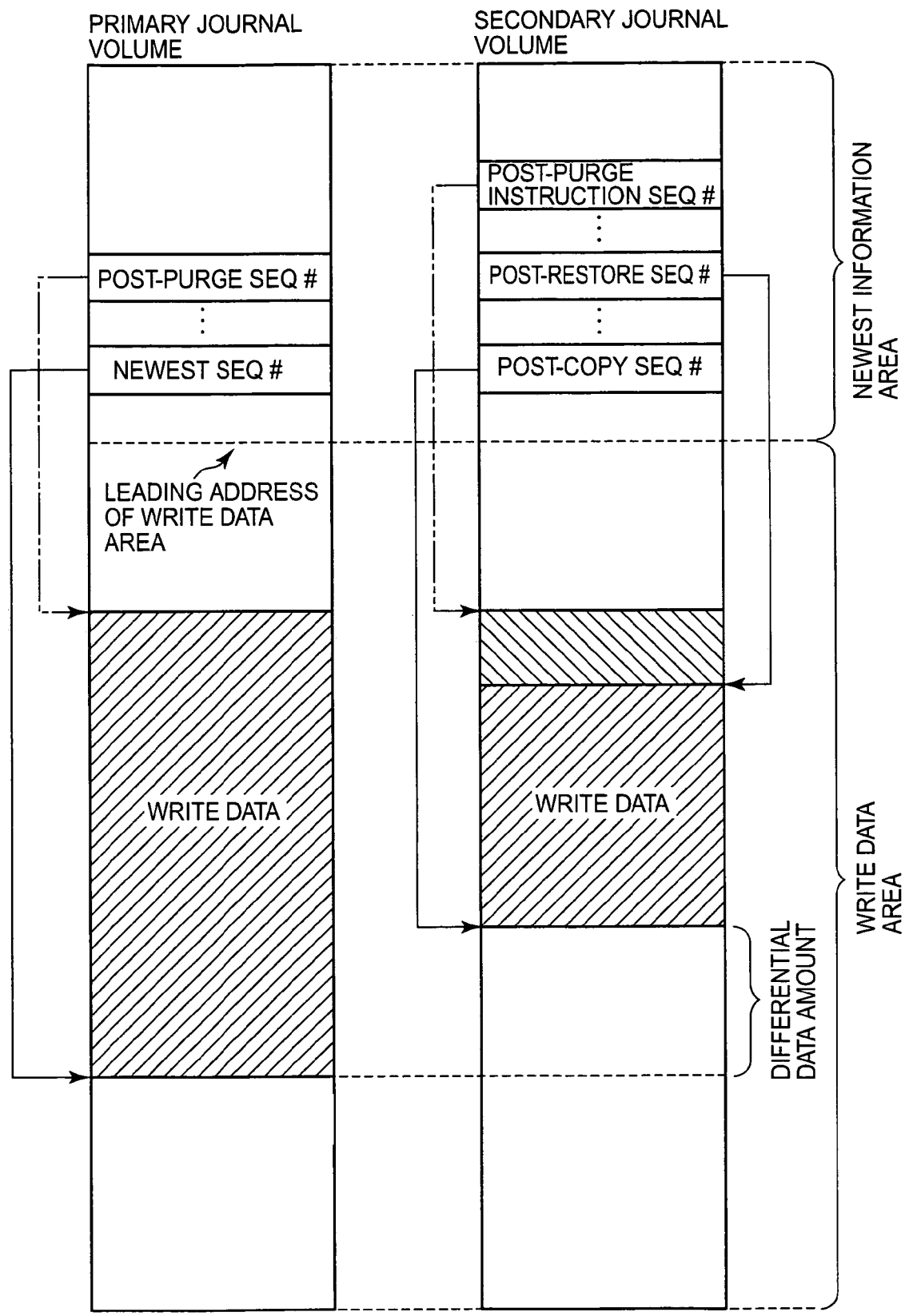
FIG. 7 shows the relation between the primary journal volume and secondary journal volumes.

FIG. 7 schematically indicates the relation between the primary journal volume 131 and the second journal volume 331. As explained above, each of the journal volumes 131, 331 comprises an update information area and a write data area.

A plurality of update management information items (control number+storage destination address) can be stored in the update information area of the primary journal volume 131. Of these update management information items, the control number comprised by the update management information item closest to the beginning of the update information area is the oldest control number stored in the journal volume 131, and is set to the journal data after the journal data erased from the journal volume 131. The control number comprised by the update management information item stored last in the update information area is the newest control number stored in the journal volume 131, and is set to the most recently performed data update.

A plurality of update management information items can also be stored in the update information area of the secondary journal volume 331. The control number comprised by the update management information item stored closest to the beginning of the update information area indicates the post-purge control number. The post-purge control number is the next number after the control number set at the end of the journal data for which an erase instruction has been issued by the primary storage control device 100. The post-restore control number is the number indicating the last journal data after incorporation into the second secondary data volume 332. The post-copy control number is the number indicating the end of the journal data copied from the primary journal volume 131 to the secondary journal volume 331.

A difference arises between the journal data stored in the primary journal volume 131 and the journal data stored in the secondary journal volume 331. This difference is eliminated with the passage of time. Journal data stored in the secondary journal volume 331 is incorporated into the second secondary data volume 332 with appropriate timing. In accordance with this incorporation, the post-restore control numbers are moved downward. The post-restore journal data need not be saved. Hence the second secondary storage control device 300 explicitly identifies to the primary storage control device 100 the control number at the end of the unnecessary journal data, and issues an erase instruction.

FIG. 8 shows the configuration of a differential management table T10 used by the first secondary storage control device 200. This differential management table T10 can for example be stored in shared memory or similar of the first secondary storage control device 200.

A differential management table T10 is prepared for each journal group. As indicated in the drawing, a table T11 is prepared for the journal group #1, and a table T12 is prepared for the journal group #2.

A plurality of bitmap tables can be included in the differential management tables used to manage the journal groups. That is, each journal group manages differences using a plurality of bitmap tables BM1, BM2.

The volumes 232 and 233 for differential management are divided into prescribed management units such as for example block units or track units, and in the bitmap tables BM1 and BM2, differential management bits are set for each of these management units. When performing a data update, the differential management bit corresponding to the update position (storage position of the write data) is set to "1". The differential management bits for places not updated are set to "0". Hence the range of data corresponding to a management unit for which the differential management bit is set to "1" becomes differential data occurring from a prescribed point in time onward. The prescribed point in time is the point in time at which differential management begins. Differential management can be performed through manual operations by a user, or can be started automatically.

Various methods for configuring the bitmap tables BM1 and BM2 are conceivable. For example, a bitmap table having a comparatively large storage area can be prepared, the storage area of the bitmap table can be divided by the number of volumes, and allocation can be performed for each volume. Or, the bitmap table storage area can be divided by the number of journal groups and space allocated to each journal group, and the storage area for each journal group can be divided by the number of volumes belonging to the journal group, with space allocated to each volume. Or, bitmap tables can be provided individually for each volume of each journal group, and the sizes of the bitmap tables can each be changed.

FIG. 9 shows a pair of management tables used by the primary storage control device 100. This pair of management tables T21 can for example be stored in the shared memory 114 of the primary storage control device 100. As is also the case for the pairs of management tables T22, T23 described below, the pair of management tables T21 is used to manage the correspondence relations between the primary data volumes 132, 133 and the first secondary data volumes 232, 233 and second secondary data volumes. Information enabling use of the bitmap tables BM1, BM2 is also provided in the pair of management tables T22 used by the first secondary storage control device 200.

The pair of management tables T21 comprises information relating to primary data volumes, information relating to first secondary data volumes corresponding to the primary data volumes, and information relating to the second secondary data volumes corresponding to the primary data volumes.

Information relating to the primary data volumes includes, for example, volume numbers (P-VOL #) used to identify primary data volumes, attributes of the primary data volumes, and the numbers of journal groups to which the primary data volumes belong.

Information relating to the first secondary data volume corresponding to the primary data volume comprises, for example, volume numbers (1S-VOL #) to identify the first secondary data volume associated with a primary data volume, first secondary journal group numbers to identify journal groups to which the first secondary data volumes belong, information indicating the pair type of the first secondary data volume and the primary data volume, and information indicating the paired state of the first secondary data volume and the primary data volume.

Similarly, information relating to the second secondary data volume corresponding to the primary data volume comprises, for example, volume numbers (2S-VOL #) to identify the second secondary data volume associated with a primary data volume, second secondary journal group numbers to identify journal groups to which the second secondary data volumes belong, information indicating the pair type of the second secondary data volume and the primary data volume, and information indicating the paired state of the second secondary data volume and the primary data volume.

Here, volume attributes include, for example, "primary" and "unused". A "primary" attribute indicates that a volume for which the attribute is set is being used as the primary data volume. An "unused" attribute indicates that the volume for which the attribute is set is prepared as a volume, but is not being used as a primary data volume. Other attributes can also be adopted.

Pair types may be, for example, "synchronous" and "asynchronous". "Synchronous" means that, as explained above, data updates of the primary data volume and data updates of a secondary data volume are performed synchronously. "Asynchronous" means that, as explained above, the time of data updates of the primary data volume and the time of data updates of secondary data volumes are not synchronized. In the case of "asynchronous" pairs, journal data is read from the secondary storage control device to the primary storage control device 100, and based on the read-out journal data, data updating (restore) of the secondary data volume is performed.

Paired states include, for example, "pair", "suspend", "simplex" and similar. "Pair" indicates a state in which two volumes form a copy pair, and the stored contents of the copy source volume (primary data volume) are incorporated into the copy destination volume (secondary data volume). "Suspend" is a state in which a copy pair is formed by copying is stopped; data updates occurring in the copy source volume are differentially managed at the copy source. "Simplex" indicates a normal volume not part of a copy pair.

FIG. 10 shows a pair management table T22 used by the first secondary storage control device 200. This pair management table T22 can for example be stored in the shared memory or similar of the first secondary storage control device 200. Similarly to the pair management table T21, the pair management table T22 manages the correspondence relation between the first secondary data volumes 232, 233 and the primary data volumes 132, 133 and second secondary data volumes 332, 333.

The pair management table T22 comprises information relating to the first secondary data volumes, information relating to the primary data volumes corresponding to the first secondary data volumes, information relating to the second secondary data volumes corresponding to the primary data volumes, and information employed to use the bitmap tables BM1, BM2. Here, an example is shown in which bitmap tables are divided by volume for use. The "current BM #" is a table number used to identify the bitmap table currently managing volume differences (the current table). The "BM address" is information indicating the starting address of the area managing volume differences.

FIG. 11 shows a pair management table T23 used by the second secondary storage control device 300. This pair management table T23 is for example stored in the shared memory or similar of the second secondary storage control device 300. The pair management table T23, similarly to the pair management tables T21 and T22, manages the correspondence relation between the second data volumes 332, 33 and the primary data volumes 132, 133 and first data volumes 232, 233.

The pair management table T23 comprises information relating to second secondary data volumes, information relating to primary data volumes corresponding to the second secondary data volumes, and information relating to first secondary data volumes corresponding to the primary data volumes.

Figure 12:
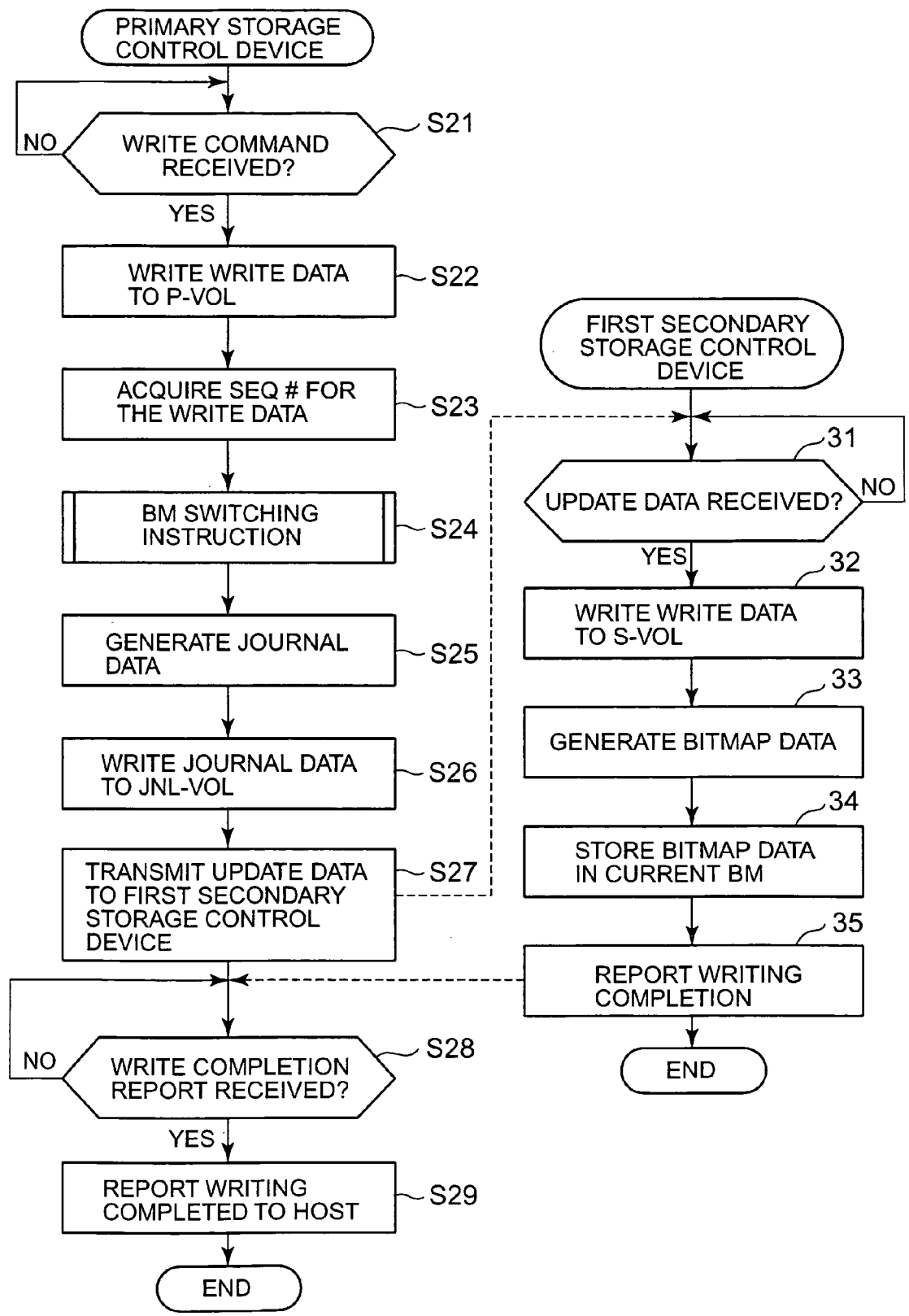
FIG. 12 is a flowchart showing processing of a write command.

FIG. 12 is a flowchart summarizing processing when a primary storage control device 100 receives a write command. Similarly to the subsequent flowcharts described below, this flowchart summarizes processing to an extent enabling implementation of the invention by a practitioner of the art, and is different from an actual program.

The primary storage control device 100 monitors the reception from the host 10A of a write command (S21). Upon receiving a write command ("YES" in S21), the primary storage control device 100 writes the write data received from the host 10A to a specified address in a specified primary data volume (S22).

The primary storage control device 100 newly acquires a control number for the write data (S23), and after performing bitmap table switching instruction processing (S24), described below, generates journal data (S25). The primary storage control device 100 causes the generated journal data to be stored in the primary journal volume 131 (S26). As explained above, journal data is stored, in the order of generation, in the journal volume.

Next, the primary storage control device 100 transmits the write data to the first secondary storage control device 200 (S27). The primary storage control device 100 then awaits a write completion report from the first secondary storage control device 200 (S28). Upon receiving a write completion report for the write data from the first secondary storage control device 200 ("YES" in S28), the primary storage control device 100 issues a report to the host 10A to the effect that write command processing has been completed (S29).

Operation of the first secondary storage control device 200 is as follows. Upon receiving write data from the primary storage control device 100 ("YES" in S31), the first secondary storage control device 200 writes the write data to a prescribed location in the corresponding first secondary data volume (S32). The prescribed location is the address to which the write data is to be written, and is explicitly indicated by the write command.

Next, the first secondary storage control device 200 generates bitmap data by setting the differential management bits corresponding to the storage positions of the write data to "1" (S33), and causes the generated bitmap data to be stored in the bitmap table currently being used (S34). The first secondary storage control device 200 then notifies the primary storage control device 100 of the storage of the write data in the first secondary data volume (S35).

Figure 13:
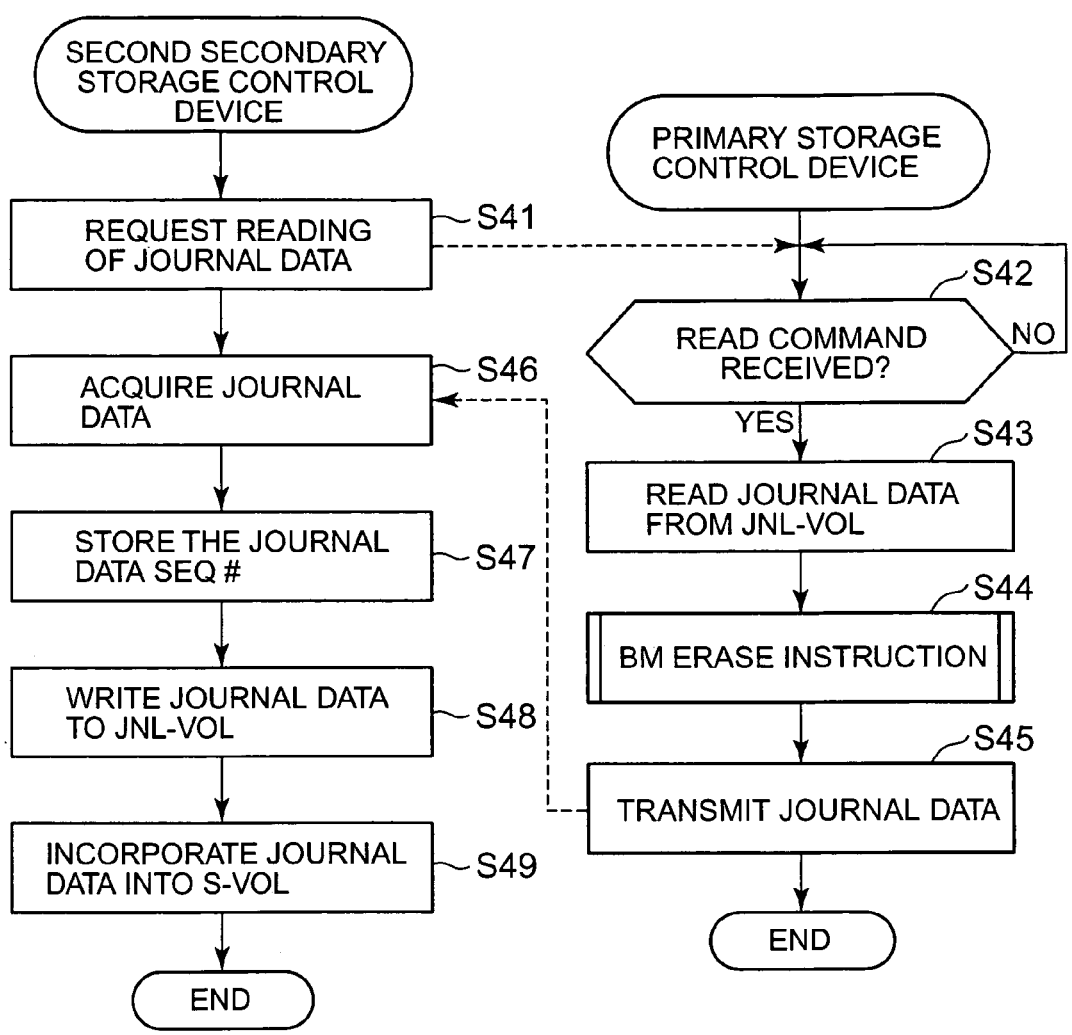
FIG. 13 is a flowchart showing processing to acquire journal data by the second secondary storage control device, using an asynchronous read method.

Next, FIG. 13 is a flowchart showing the data update processing by the second secondary storage control device 300. The second secondary storage control device 300 can request journal data reading by the primary storage control device 100 with a comparatively short period (S41).

The primary storage control device 100, upon receiving a read request from the second secondary storage control device 300 ("YES" in S42), reads journal data from the primary journal volume 131 (S43), and after performing the bitmap table erase instruction processing described below (S44), transmits the read-out journal data to the second secondary storage control device 300 (S45). Here, the primary storage control device 100 supplies the second secondary storage control device 300 with journal data in which are set control numbers starting from the most recent control number stored by the second secondary storage control device 300. Journal data previously transmitted is not transmitted to the second secondary storage control device 300.

The second secondary storage control device 300, upon acquiring journal data from the primary storage control device 100 (S46), causes the control numbers set in this journal data to be stored in shared memory (S47). The second secondary storage control device 300 then writes the journal data to the secondary journal volume 331 (S48). The second secondary storage control device 300 incorporates the journal data stored in the secondary journal volume 331 into a second secondary data volume with appropriate timing (S49). That is, the second secondary storage control device 300 need not cause the second secondary data volume to be updated at the same time that journal data is acquired from the primary storage control device 100.

Figure 14:
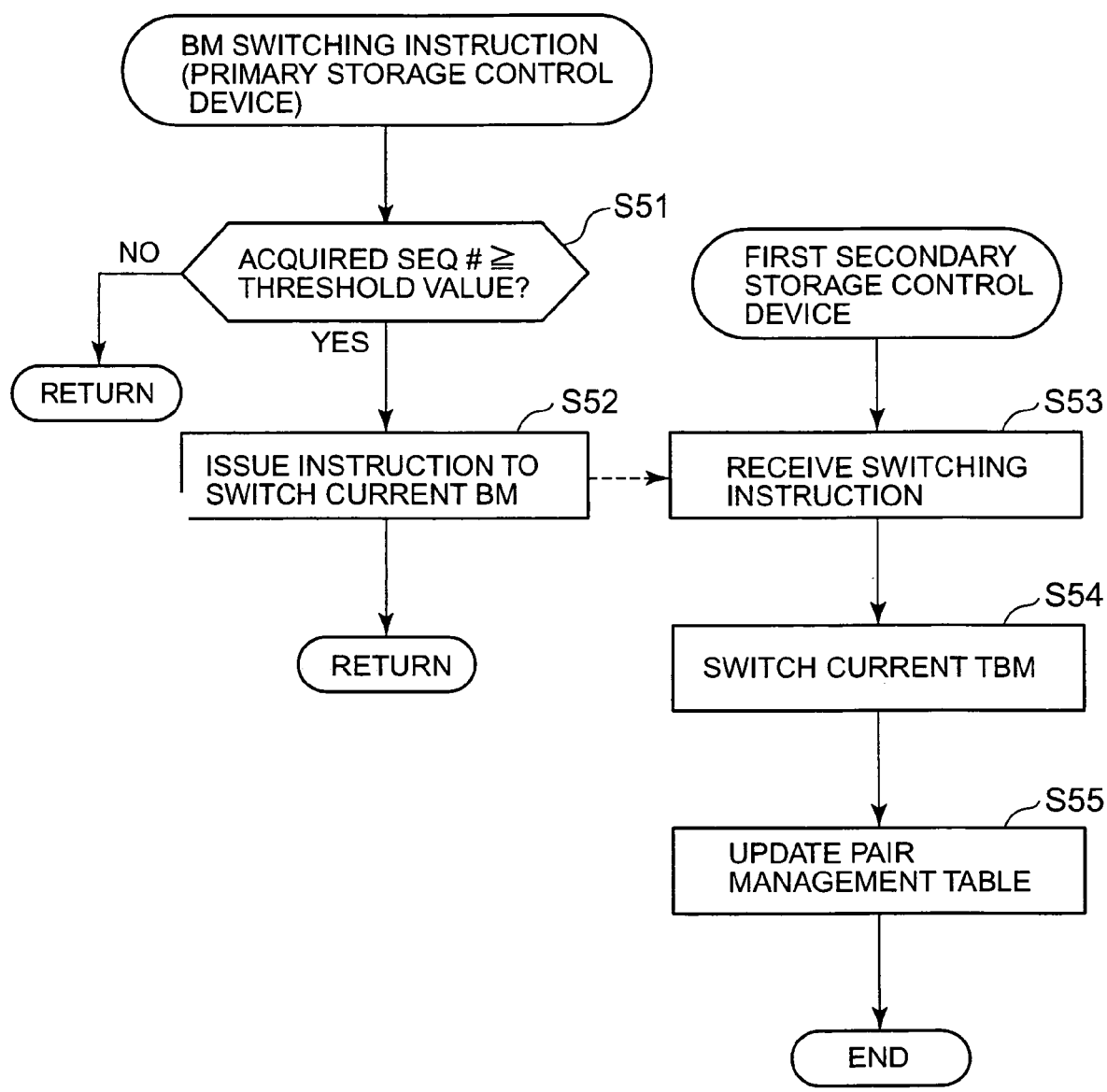
FIG. 14 is a flowchart showing processing to cause switching of a bitmap table.

FIG. 14 is a flowchart showing the bitmap table switching instruction processing indicated by S24 in FIG. 12. The primary storage control device 100 judges whether the newly acquired control number has reached a threshold value (S51). If the control number has not reached the threshold value ("NO" in S51), processing returns to the processing shown in FIG. 12.

If the control number has reached the threshold value ("YES" in S51), the primary storage control device 100 issues an instruction to the first secondary storage control device 200 to switch the bitmap table (S52). The first secondary storage control device 200, upon receiving this switching instruction (S53), switches the current bitmap table (S54). That is, the first secondary storage control device 200 switches from the bitmap table currently in use to a standby bitmap table, and causes updating of information in the pair management table T22 indicating the current bitmap table (S55).

Figure 15:
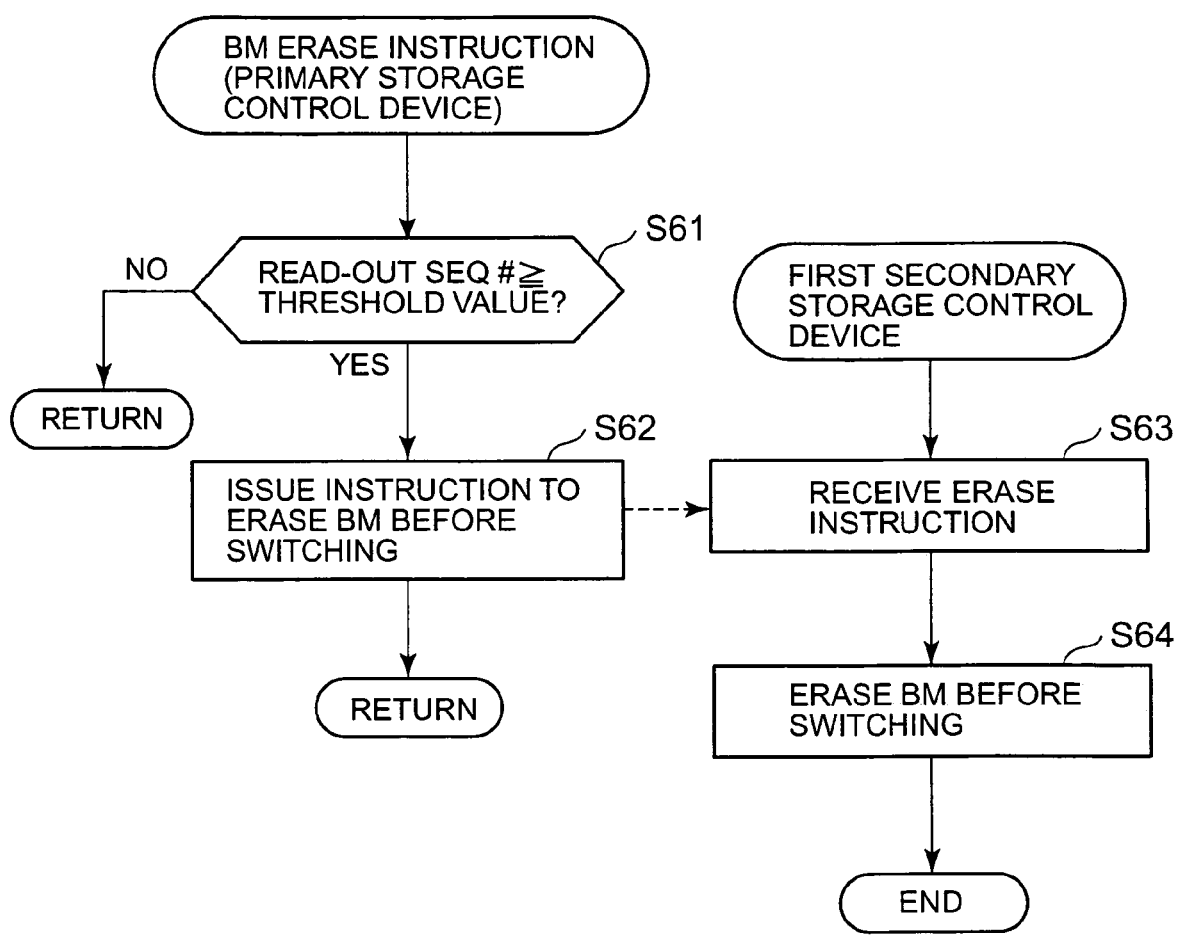
FIG. 15 is a flowchart showing processing to cause erasure of stored contents of a bitmap table.

FIG. 15 is a flowchart showing the bitmap table erase instruction processing indicated by S44 in FIG. 13. The primary storage control device 100 judges whether the control numbers in journal data read by the second secondary storage control device 300 have reached a threshold value (S61). If the control numbers have not reached the threshold value ("NO" in S61), processing returns to the processing indicated in FIG. 13.

If the control numbers have reached the threshold value ("YES" in S61), the primary storage control device 100 issues an instruction to the first secondary storage control device 200 to erase the bitmap table (S62). The first secondary storage control device 200, upon receiving this erase instruction (S63), causes erasure of the stored contents of the bitmap table being used before the bitmap table currently in use (the bitmap table in use before switching) (S64). That is, the differential management bits in the bitmap table are all set to "0".

Figure 16:
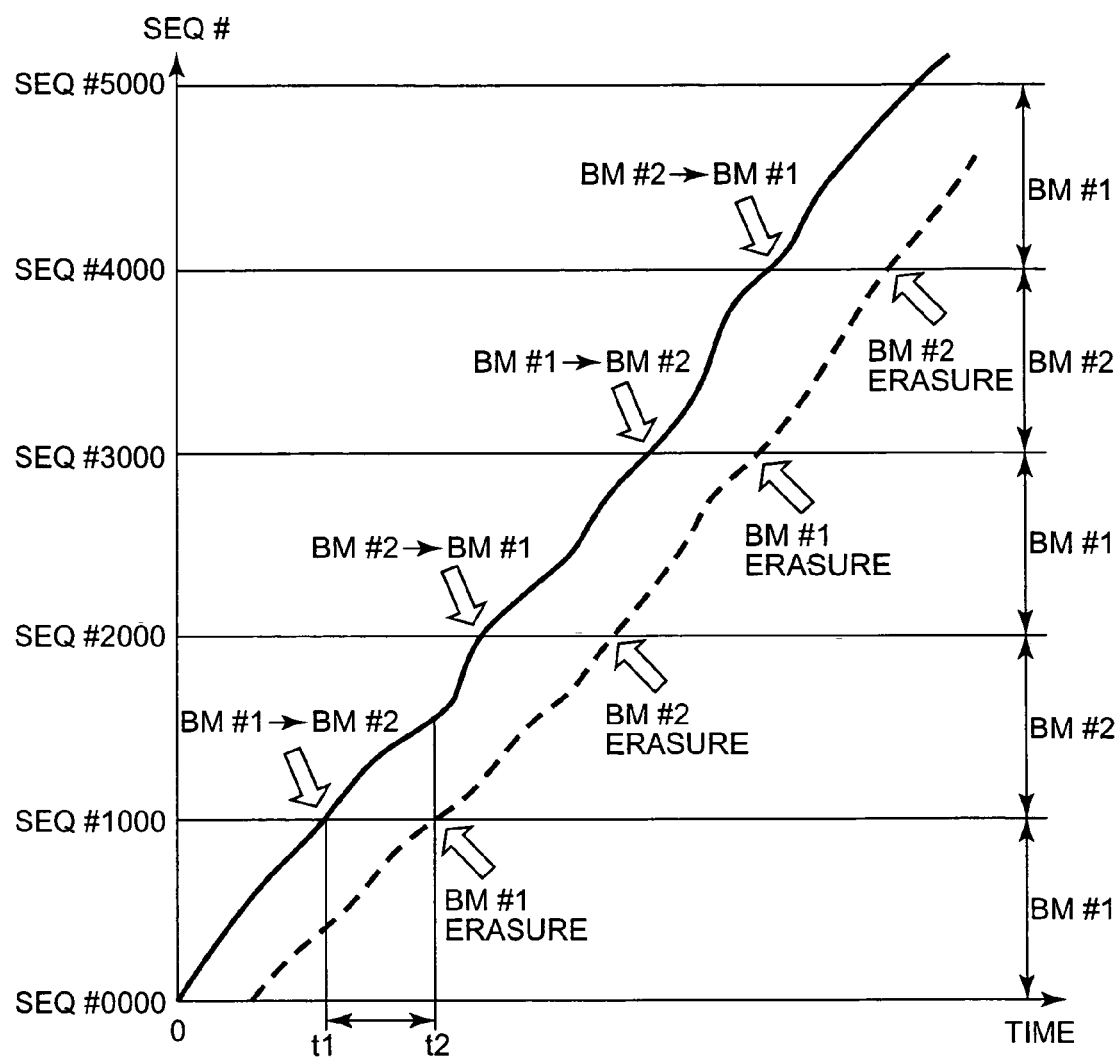
FIG. 16 schematically shows the timing of switching and erasure of bitmap tables.

FIG. 16 schematically shows the relation between the bitmap table switching timing and erase timing. The horizontal axis represents elapsed time, and the vertical axis indicates control numbers. The bold solid line in the figure denotes changes in control numbers acquired upon each write request from the host 10A; the broken line in the figure denotes changes in control numbers in journal data read by the second secondary storage control device 300. The switching threshold value and erase threshold value are both assumed to be set to "1000".

The solid-line graph is explained. Each time a write command is received, the control number value increases. Each time the control number value increases by 1000, switching between the bitmap tables BM1 and BM2 is performed. On the right side of the figure, the numbers of bitmap tables selected as the current bitmap table are shown.

The broken-line graph is explained. Each time the value of the control number of journal data read by the second secondary storage control device 300 increases by 1000, the contents of the bitmap table prior to switching are erased. For example, at time t2 the current bitmap table is switched from BM1 to BM2, and the stored contents of the table BM1 prior to switching are erased.

A certain lag occurs between the time t1 of the switching instruction and the time t2 of the erase instruction. The amount of this lag varies depending on the frequency of updates by the host 10A, and the circumstances of communication between the primary storage control device 100 and the second secondary storage control device 300. After the stored contents of a bitmap table which has already been used in differential management are erased, the table is used once again. The bitmap table size and similar can be determined such that the switching instruction is issued before the erase instruction is issued.

Figure 17:
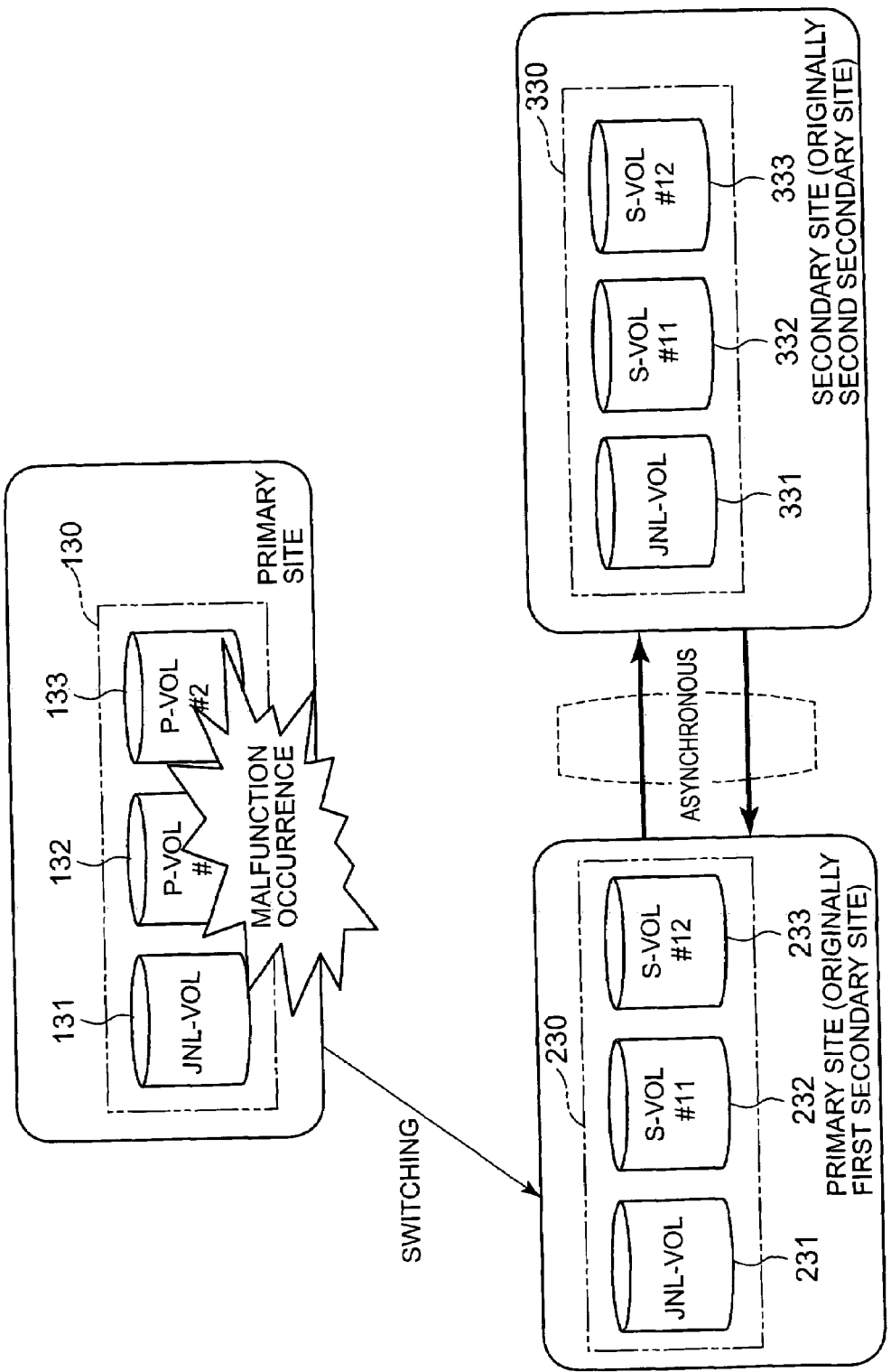
FIG. 17 shows the manner of switching of the main storage control device from the primary storage control device to the first secondary storage control device.

Next, a case is explained in which, due to occurrence of a malfunction or similar, there is switching from the primary storage control device 100 to the first secondary storage control device 200. FIG. 17 shows schematically the manner of switching from the primary storage control device 100 to the first secondary storage control device 200.

As explained above, the primary storage control device 100 is designed internally to be redundant both physically and logically, and data losses and similar are suppressed. However, there is the possibility that operation of the primary storage control device 100 may stop due to malfunctions arising from a disaster or similar.

When a malfunction occurs and operation of the primary storage control device 100 stops, in place of the primary storage control device 100, the first secondary storage control device 200 is selected as the main storage control device. The first secondary storage control device 200 becomes the new primary storage control device, and the site in which the first secondary storage control device 200 is located becomes the primary site.

Each of the first secondary data volumes 232, 233 of the first secondary storage control device 200 becomes a primary data volume, and forms a copy pair with each of the second secondary data volumes 332, 333 of the second secondary storage control device 300. Here, the first secondary data volumes 232, 233 and the second secondary data volumes 332, 333 form a copy pair by a so-called asynchronous reading method. Seen from the viewpoint of the second secondary storage control device 300, the source of acquisition of journal data of the second secondary storage control device 300 is switched from the primary storage control device 100 to the first secondary storage control device 200. As explained below, upon switching from the primary storage control device 100 to the first secondary storage control device 200, the first secondary storage control device 200 generates a journal volume and begins differential management using journal data.

Figure 18:
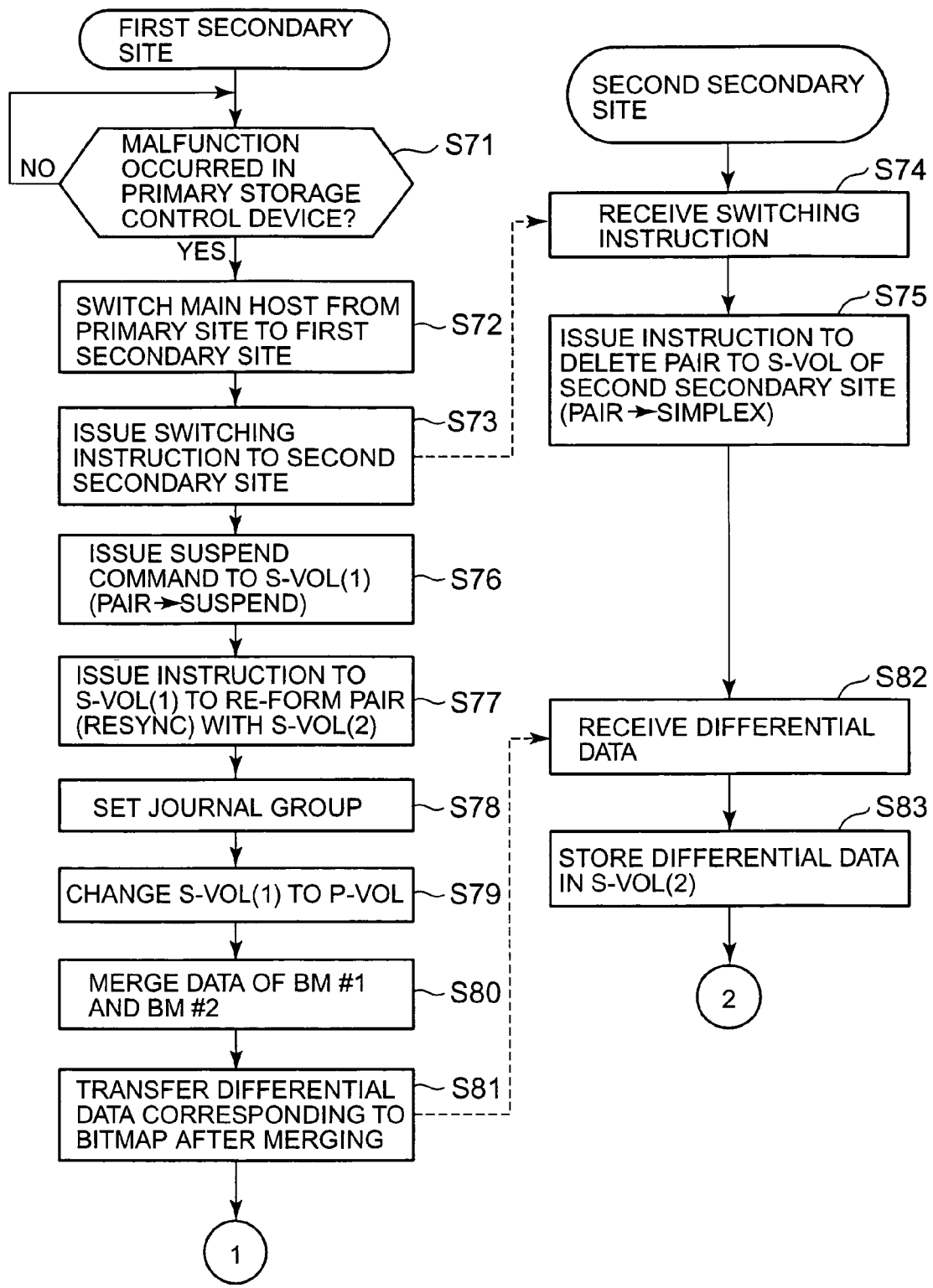
FIG. 18 is a flowchart showing processing to switch from the primary site to a first secondary site.

Processing when the main storage control device is switched is explained, referring to the flowchart of FIG. 18. When for example the host 10B or management terminal 20B of the first secondary site detects the occurrence of a malfunction in the primary storage control device 100 ("YES" in S71), the main host is switched from the host 10A of the primary site to the host 10B of the first secondary site (S72). For convenience of explanation, it is assumed that the host 10B issues instructions to the storage control devices; but the management terminal 20B may be used as well.

Main host switching can be performed automatically, or can be performed through manual operations by a system manager or other user. For example, a malfunction in the primary site may be detected based on stoppage of heartbeat communication between the host 10A and host 10B or similar, as a result of which automatic switching from the host 10A to the host 10B occurs. Or, for example, the manager of the primary site can use e-mail, a telephone or other means to instruct the manager of the first secondary site to perform switching by manual operation.

In a case in which a malfunction occurs only in the primary storage control device 100, the host 10A is operating normally, and a communication path can be set between the host 10A and the first secondary storage control device 200, the host 10A can continue to be used without modification as the main host. In this case, only the main storage control device is switched from the primary storage control device 100 to the first secondary storage control device 200. Here, however, an example is explained in which, due to a disaster, both the host 10A of the primary site and the primary storage control device 100 have stopped functioning.

The host 10B of the first secondary site issues an instruction to the second secondary storage control device 300 of the second secondary site to perform switching (S73). The second secondary storage control device 300, upon receiving the switching instruction from the first secondary site (S74), issues instructions to the second secondary data volumes 332, 333 to delete the respective copy pairs (S75). By this means, the second secondary data volumes 332, 333 each dissolve the copy pairs previously formed with the primary data volumes 132, 133, making a transition to the simplex state.

The host 10B of the first secondary site issues a suspend command to the first secondary data volumes 232, 233 (S76). As a result, each of the first secondary data volumes 232, 233 dissolves the copy pairs with the primary data volumes 132, 133, and makes a transition to the suspended state. Data updates from the host 10B to the first secondary data volumes 232, 233 are managed through the differential management table T10.

The host 10B issues a Resync command to the first secondary data volumes 232, 233 (S77). Then, the host 10B changes the first secondary journal group to the primary journal group (S78), and causes the volume attributes of the first secondary data volumes 232, 233 to be changed to primary data volume attributes (S79).

Then, the host 10B causes the contents of the bitmap tables BM1, BM2 to be merged via the first secondary storage control device 200 (S80), and based on the bitmap table resulting from the merging, causes differential data to be transmitted from the first secondary storage control device 200 to the second secondary storage control device 300 (S81).

As indicated in FIG. 16, the stored contents of the bitmap tables BM1, BM2 are caused to be merged due to the difference between the timing of the switching and the timing of the erasure of the bitmap tables. Hence differential copying is begun taking into account both the current bitmap table and the bitmap table previously being used.

The second secondary storage control device 300, upon receiving the differential data (S82), causes the data to be stored in the second secondary data volumes 332, 333 (S83).

Figure 19:
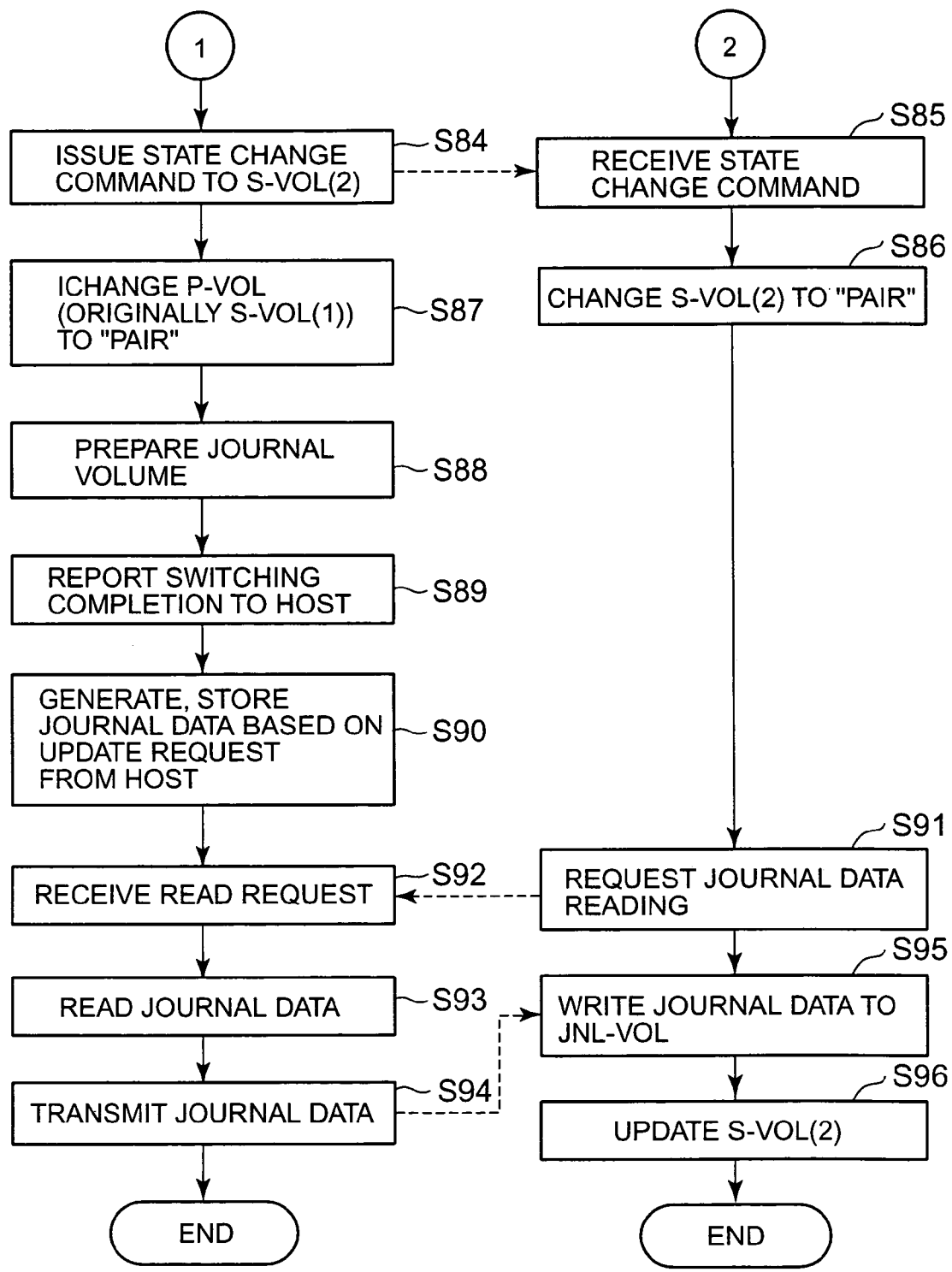
FIG. 19 is a flowchart which continues that in FIG. 15.

FIG. 19 is a flowchart which continues that of FIG. 18. The host 10B issues a state change command to the second secondary data volumes 332, 333 (S84). The second secondary storage control device 300, upon receiving this state change command (S85), changes the paired state of the second secondary data volumes 332, 333 to "pair" (S86).

Also, the host 10B issues a state change command to the first secondary data volumes 232, 233 which have become the primary data volumes, causing the paired states of the first secondary data volumes 232, 233 to be changed to "pair" (S87). And, the host 10B prepares a journal volume in the first secondary storage control device 200 (S88).

As a result, switching from the storage control device 100 to the storage control device 200 is completed normally, and so a report of switching completion is sent from the first secondary storage control device 200 to the host 10B (S89). Thus by connecting the first secondary storage control device 200, which has become the primary storage control device, and the second secondary storage control device 300 through an asynchronous reading method, switching can be completed in a short time.

The first secondary storage control device 200 generates journal data each time a write request (update request) is received from the host 10B, and causes the journal data to be stored in the journal volume 231 (S90), similarly to the operations which had been performed by the primary storage control device 100.

The second secondary storage control device 300 issues requests to read journal data to the first secondary storage control device 200 with a comparatively short period (S91), similarly to the manner in which such requests had been issued to the primary storage control device 100 prior to the occurrence of the malfunction. The first secondary storage control device 200, upon receiving a journal data read request (S92), reads the journal data from the journal volume 231 (S93), and transmits the journal data to the second secondary storage control device 300 (S94).

The second secondary storage control device 300 receives the journal data and causes the data to be stored in the journal volume 331 (S95), and causes update of the stored contents of the second secondary volumes 332, 333 with appropriate timing (S96).

Through the above-described configuration, this embodiment provides the following advantageous results. First, in this embodiment, the first secondary storage control device 200 employs the bitmap tables BM1, BM2 to manage data updates of the first secondary volumes 232, 233, and upon switching from the primary storage control device 100 to the first secondary storage control device 200, causes only the differential data to be copied from the first secondary storage control device 200 to the second secondary storage control device 300. Hence compared with a case in which a so-called full copy is performed between a first secondary volume 2A and a second secondary volume 3A, the time required for pair formation can be shortened. Further, the first secondary storage control device 200 does not comprise a mechanism for managing the extent to which the second secondary storage control device 300 has updated the second secondary volumes 332, 333, but transmits differential data for a prescribed point in time and later. Hence the control structure can be simplified.

In this aspect, a plurality of bitmap tables BM1, BM2 are switched and used in alternation, while erasing unnecessary stored content. Hence while using one of the bitmap tables, the other bitmap table can be caused to be reset and prepared for reuse, and so the bitmap table size can be made comparatively small. By this means, the management information (bitmap tables) used in differential management can be reduced, and the memory resources of the second secondary storage control device 200 can be utilized effectively.

In this aspect, the first secondary storage control device 200 which becomes the primary storage control device and the second secondary storage control device 300 are connected by an asynchronous reading method (called an UR method). That is, the occurrence of temporarily differences between the copy source volume and the copy destination volume is accommodated, and differences are managed as journal data by the copy source storage control device 200. Hence completion of switching can be reported comparatively quickly to the host 10B, switching times can be shortened, and convenience of use and reliability can be improved.

Embodiment 2

Figure 20:
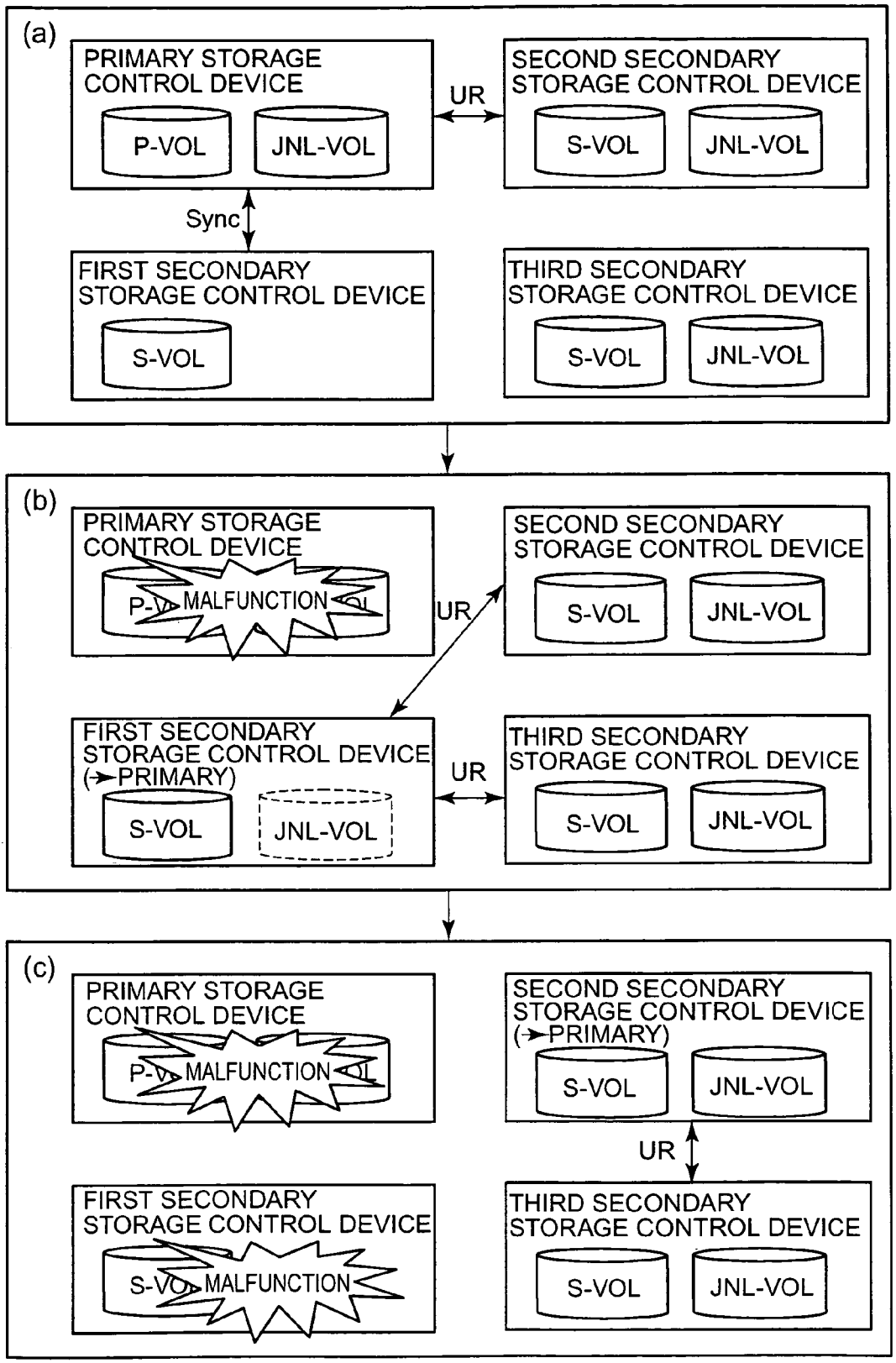
FIG. 20 schematically shows the overall configuration of the storage system of a second embodiment, in which (a) is the case of normal operation, (b) is a case of switching from the primary storage control device to the first secondary storage control device, and (c) is the case of further switching from the first secondary storage control device to the second secondary storage control device; and, FIG. 21 is a flowchart showing a portion of the switching processing executed by the storage system of a third embodiment.

A second embodiment of the invention is explained, referring to FIG. 20. The following embodiments, including this embodiment, are equivalent to modified examples of the first embodiment. In this embodiment, four storage control devices are used to enhance the redundancy of the storage system.

In FIG. 20, (a) shows the state during normal operation. In this storage system, in addition to the primary storage control device 100, first secondary storage control device 200, and second secondary storage control device 300, a third secondary storage control device 400 is provided.

As explained in the first embodiment, the primary storage control device 100 and first secondary storage control device 200 are connected by a synchronous method, and the primary storage control device 100 and second secondary storage control device 300 are connected by an asynchronous reading method.

(b) in FIG. 20 shows a case in which a malfunction or similar has occurred in the primary storage control device 100. In this case, similarly to Embodiment 1, the first secondary storage control device 200 becomes the primary storage control device, and is connected by an asynchronous reading method with the second secondary storage control device 300. The first secondary storage control device 200 is also connected by an asynchronous reading method with the third secondary storage control device 400.

(c) in FIG. 20 shows a case in which a malfunction has occurred and operation has stopped in the first secondary storage control device 200. In this case, the second secondary storage control device 300 becomes the primary storage control device, and is connected by an asynchronous reading method with the third secondary storage control device 400.

When four storage control devices are thus used to form a storage system, even if two malfunctions occur in succession, the redundancy of the storage system can be maintained, so that reliability can be further enhanced. This invention is not limited to the case of four storage control devices, but can be applied to cases using five or more storage control devices.

Embodiment 3

Figure 21:
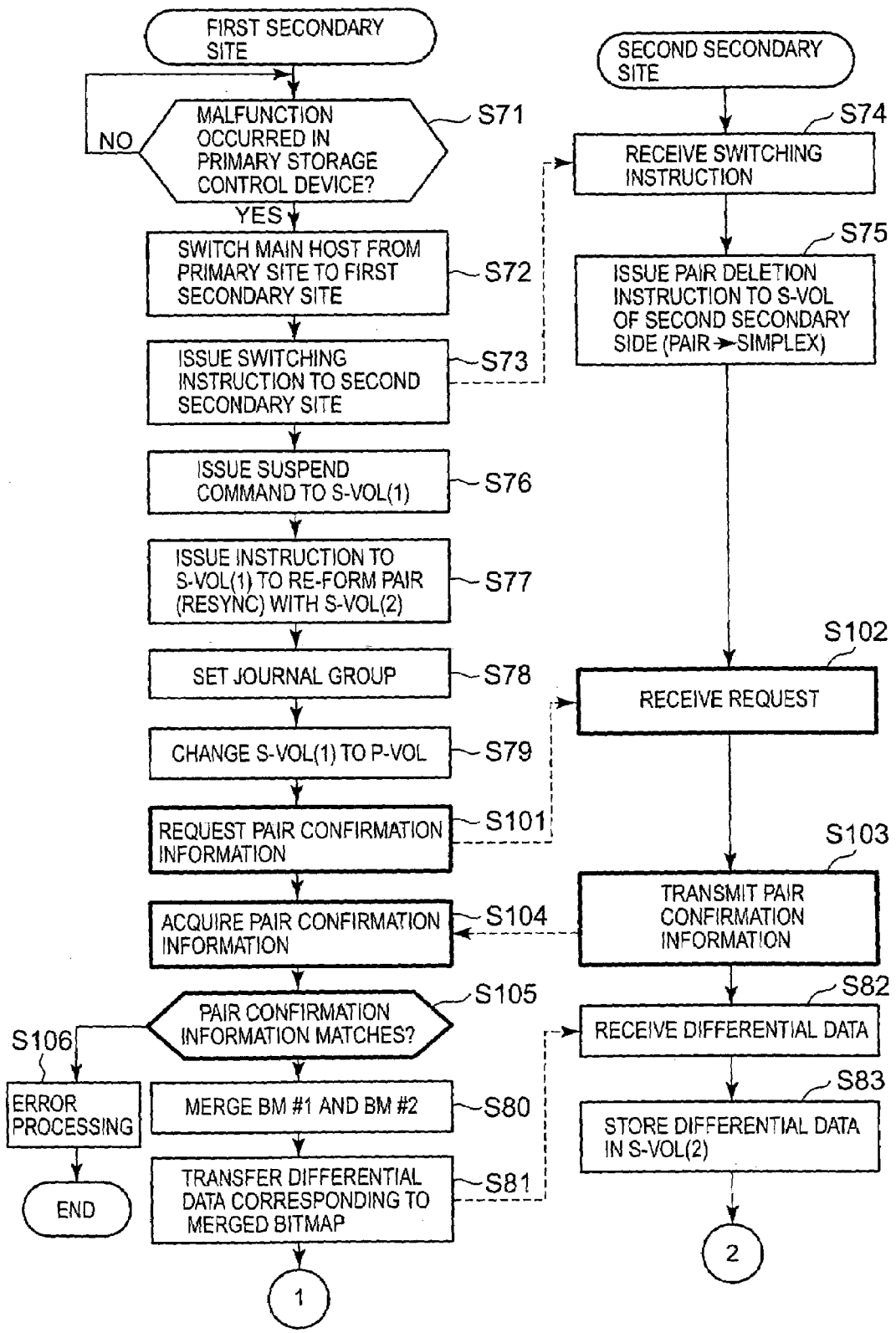

A third embodiment is explained using FIG. 21. In this embodiment, the correspondence relations between the storage control devices 100, 200, 300 are not held by the storage control devices 100, 200, 300, but the secondary storage control devices 200 and 300 each hold only the correspondence relation with the primary storage control device 100.

FIG. 21 is a flowchart showing a portion of the processing executed by the storage system of the third embodiment. This flowchart corresponds to the flowchart of FIG. 18, and includes common steps. Here explanations of the common steps are omitted, and the characteristic steps are mainly explained.

After S79, the host 10B issues a request for transmission of pair confirmation information to the second secondary storage control device 300 (S101). Pair confirmation information is information used to confirm the correspondence relation between the first secondary data volumes 232, 233 and the second secondary data volumes 332, 333.

Here, as pair confirmation information, for example, the product number, M.VOL number, or similar can be used. The product number os a device identification number of the primary storage control device 100. The M.VOL number is the volume number of the paired volume corresponding to the second secondary data volume 332 or 333. The device identification number of the primary storage control device 100 and the volume numbers of the volumes corresponding to the second secondary data volumes 332, 333 are stored by the second secondary storage control device 300.

The second secondary storage control device 300, upon receiving a request for acquisition of pair confirmation information (S102), transmits pair confirmation information to the first secondary storage control device 200 (S103). The first secondary storage control device 200, upon acquiring pair confirmation information (S104), judges whether this pair confirmation information matches the pair confirmation information stored in advance in the first secondary storage control device 200 (S105).

When the two pair confirmation information items match ("YES" in S105), the second secondary storage control device 300 corresponds to the first secondary storage control device 200, and connection is possible. Hence the first secondary storage control device 200 executes the steps S80 and beyond. When on the other hand the two pair confirmation information items do not match ("NO" in S105), the second secondary storage control device 300 does not correspond to the first secondary storage control device 200. Hence error processing is performed (S106). In this error processing, for example, the user is notified of an error message.

In this way, based on pair confirmation information, the first secondary storage control device 200 is confirmed to correspond to the second secondary storage control device 300, and by causing the two to be connected, the amount of information in the pair management tables T22, T23 managed by the secondary storage control devices 200, 300 can be reduced.

This invention is not limited to the above aspects, and a practitioner of the art can make various additions, modifications and similar within the scope of the invention. For example, as the communication protocol, SAN and LAN were used as examples; however, the invention is not limited to these, and application to other protocols such as for example iSCSI, ESCON (a registered trademark), and FICON (a registered trademark) is possible.

What is claimed is:

1. A storage system, in which a second storage control device and a third storage control device are each connected to a first storage control device, wherein
    the first storage control device comprises a first data volume, a first journal volume which manages the update history of the first data volume, and a first control portion which, when a higher-level device writes write data to the first data volume, generates journal data with a control number set for the write data, stores the journal data in the first journal volume, and transmits the write data to the second storage control device;
    the second storage control device comprises a second data volume associated with the first data volume, and a second control portion which stores the write data received from the first control portion to the second data volume, and stores the storage position of the write data in a differential management table;
    the third storage control device comprises a third data volume associated with the first data volume, a second journal volume associated with the first journal volume, and a third control portion which reads the journal data from the first journal volume and stores the journal data in the second journal volume, and which updated stored contents of the third data volume based on the journal data stored in the second journal volume; and
    upon switching from the first storage control device to the second storage control device, the second control portion transmits differential data to the third storage control device based on the differential management table, and stores the differential data in the third volume.

2. The storage system according to claim 1, wherein the second control portion, upon formation of a copy pair with the second data volume as the primary volume and the third data volume as the secondary volume, notifies the higher-level device of the completion of switching from the first storage control device to the second storage control device.

3. The storage system according to claim 1, wherein
    upon switching from the first storage control device to the second storage control device, when the higher-level device writes write data to the second data volume, the second control portion sets a control number for the write data and generates journal data, and stores the journal data in a third journal volume; and
    the third control portion reads the journal data from the third journal volume and stores the journal data in the second journal volume, and, based on the journal data stored in the second journal volume, updates the stored contents of the third data volume.

4. The storage system according to claim 1, wherein a plurality of the differential management tables are provided, and the second control portion switches between and uses the plurality of differential management tables.

5. The storage system according to claim 4, wherein each of the differential management tables includes a bitmap which corresponds each differential management bit to an update position.

6. The storage system according to claim 1, wherein
    a plurality of the differential management tables are provided; and
    upon switching from the first storage control device to the second storage control device, the second control portion detects differential data based on the stored contents of each of the plurality of differential management tables, transmits the detected differential data to the third storage control device, and stores the detected differential data in the third volume.

7. The storage system according to claim 6, wherein when the value of the control number set for write data received from the higher-level device reaches a switching threshold value set in advance, the first control portion issues a switching instruction to the second control portion, and, when the value of the control number set for the journal data read from the first journal volume by the third control portion reaches an erase threshold value set in advance, the first control portion issues an erase instruction to the second control portion; and upon receiving the switching instruction, the second control portion switches the differential management table being used among the plurality of differential management tables, and when the erase instruction is received, the second control portion erases the stored contents of the differential management table being used before the differential management table currently in use among the plurality of differential management tables.

8. The storage system according to claim 1, wherein the differential management table includes a bitmap which corresponds each differential management bit to an update position.

9. The storage system according to claim 1, wherein the first storage control device judges whether a newly acquired control number has reached a threshold value, and if the newly acquired control number has reached the threshold value, the first storage control device issues a switching instruction to the second storage control device to switch from the differential management table to a standby differential management table.

10. The storage system according to claim 9, wherein the second storage control device, upon receiving this switching instruction, switches the differential management table accordingly, and causes updating of information in a pair management table indicating the standby differential management table.

11. The storage system according to claim 9, wherein the second storage control device switches between the differential management table and the standby differential management table, and erases contents stored in a not in used differential management table after each switch.

12. The storage system according to claim 1, wherein the first storage control device judges whether control numbers in journal data read by the third storage control device have reached a threshold value, and if the control numbers have reached the threshold value, the first storage control device issues an erase instruction to the second storage control device to erase contents stored in a previously-used differential management table.

13. The storage system according to claim 12, wherein the second storage control device, upon receiving the erase instruction, causes erasure of the stored contents of the previously-used differential management table.

14. A storage system management method for managing a storage system in which a second storage control device and a third storage control device are each connected to a first storage control device, comprising the steps of:

when a higher-level device writes write data to a first data volume of the first storage control device, setting a control number for the write data and generating journal data;

storing the generated journal data in a first journal volume of the first storage control device;

transmitting the write data from the first storage control device to the second storage control device;

storing write data transmitted from the first storage control device to the second storage control device in a second data volume of the second storage control device;

registering, in a differential management table including a bitmap which corresponds each differential management bit to an update position, the storage position at which the write data is stored in the second data volume;

when a prescribed time has arrived, accessing the first storage control device from the third storage control device, and acquiring the journal data stored in the first journal volume;

storing the acquired journal data in a second journal volume of the third storage control device; and based on the journal data stored in the second journal volume, updating stored contents of a third data volume of the third storage control device.

15. The storage system management method according to claim 14, further comprising the steps of:

monitoring the occurrence of a malfunction in the first storage control device;

when a malfunction occurs in the first storage control device, based on the stored contents of the differential management table, transmitting differential data to the third storage control device, and storing the differential data in the third volume;

forming a copy pair with the second data volume as the primary volume and the third data volume as the secondary volume;

upon forming the copy pair, notifying the higher-level device of the completion of switching from the first storage control device to the second storage control device;

when the higher-level device writes write data to the second data volume, setting a control number for the write data and generating journal data;

storing the generated journal data in a third journal volume of the second storage control device;

when a prescribed time has arrived, accessing the second storage control device from the third storage control device, and acquiring the journal data stored in the third journal volume;

storing the acquired journal data in the second journal volume; and based on the journal data stored in the second journal volume, updating the stored contents of the third data volume.

* * * * *